United States Patent
Stephan

(10) Patent No.: US 12,079,603 B2
(45) Date of Patent: Sep. 3, 2024

(54) UNIVERSAL APPLICATION FRAMEWORK FOR STREAMLINED FRONTEND DEVELOPMENT OF USER INTERFACE

(71) Applicant: OPEN TEXT SA ULC, Halifax (CA)

(72) Inventor: Florian Stephan, Waakirchen (DE)

(73) Assignee: OPEN TEXT SA ULC, Halifax (CA)

( * ) Notice: Subject to any disclaimer, the term of this patent is extended or adjusted under 35 U.S.C. 154(b) by 69 days.

(21) Appl. No.: 17/549,610

(22) Filed: Dec. 13, 2021

(65) Prior Publication Data
US 2022/0100479 A1    Mar. 31, 2022

Related U.S. Application Data

(63) Continuation of application No. 16/168,425, filed on Oct. 23, 2018, now Pat. No. 11,200,034.

(60) Provisional application No. 62/575,617, filed on Oct. 23, 2017.

(51) Int. Cl.
| | |
|---|---|
| G06F 8/38 | (2018.01) |
| G06F 9/448 | (2018.01) |
| G06F 9/451 | (2018.01) |
| G06F 9/48 | (2006.01) |

(52) U.S. Cl.
CPC .............. *G06F 8/38* (2013.01); *G06F 9/448* (2018.02); *G06F 9/451* (2018.02); *G06F 9/4843* (2013.01)

(58) Field of Classification Search
CPC . G06F 8/38; G06F 9/448; G06F 9/451; G06F 9/4843
See application file for complete search history.

(56) References Cited

U.S. PATENT DOCUMENTS

| | | |
|---|---|---|
| 11,200,034 B2 | 12/2021 | Stephan |
| 2004/0003347 A1 | 1/2004 | Saidenberg et al. |
| 2004/0122925 A1 | 6/2004 | Offermann |
| 2005/0204332 A1* | 9/2005 | Krishnan ............... G06F 9/454 717/102 |
| 2011/0107266 A1 | 5/2011 | Hegde et al. |

(Continued)

OTHER PUBLICATIONS

Notice of Allowance issued for U.S. Appl. No. 16/168,425, dated Aug. 9, 2021, 18 pages.

(Continued)

*Primary Examiner* — Alvin H Tan
(74) *Attorney, Agent, or Firm* — SPRINKLE IP LAW GROUP

(57) ABSTRACT

A universal application framework enables efficient user purposeful interface (UI) application development with a novel perspective editor which itself can be an UI application. The perspective editor can be utilized to create perspectives, each of which can be specific to a purpose. UI applications thus developed can be mapped to the same target mapping which points to a technical application component of a frontend server of the universal application framework. The technical application component can provide action and navigation information for a part of the UI applications not specific to any purpose. A perspective is bound to logical entities such as a node representing rows from a table. The perspective can have a perspective type and a data view of the rows from the table in a layout. The perspective type controls which data view is usable in the perspective.

20 Claims, 27 Drawing Sheets

(56) References Cited

U.S. PATENT DOCUMENTS

| | | | |
|---|---|---|---|
| 2012/0137211 A1* | 5/2012 | Lewontin | G06F 40/154 |
| | | | 715/236 |
| 2012/0137235 A1 | 5/2012 | Sabarish et al. | |
| 2013/0024760 A1 | 1/2013 | Vogel et al. | |
| 2017/0185395 A1* | 6/2017 | Arians | G06F 8/71 |
| 2017/0344218 A1 | 11/2017 | Jann et al. | |
| 2019/0050784 A1* | 2/2019 | Millhouse | G06Q 10/063114 |
| 2022/0100479 A1 | 3/2022 | Stephan | |

OTHER PUBLICATIONS

Examination Report issued for European Patent Application No. 18202111.3, dated Nov. 26, 2021, 5 pages.

Office Action issued by the U.S. Patent and Trademark Office (USPTO) for U.S. Appl. No. 16/414,569, dated Oct. 13, 2022, 27 pages.

Office Action issued by the U.S. Patent and Trademark Office (USPTO) for U.S. Appl. No. 16/414,569, dated Feb. 15, 2023, 28 pages.

Office Action issued by the United States Patent and Trademark Office (USPTO) for U.S. Appl. No. 16/414,569, mailed Oct. 31, 2023, 31 pages.

* cited by examiner

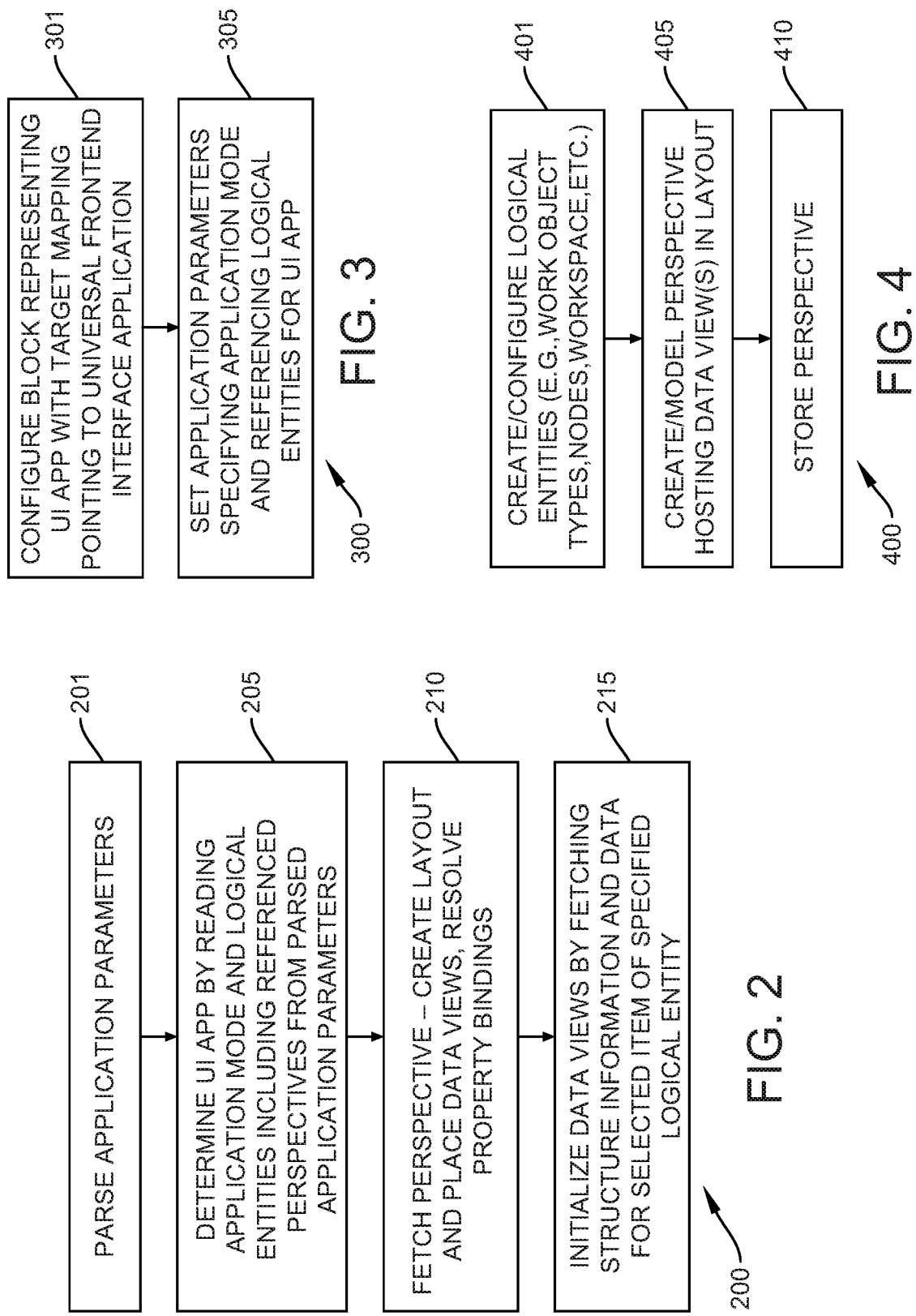

| PRODUCT ID | PRODUCT NAME | SUPPLIER ID | CATEGORY ID | QUANTITY PER UNIT | UNIT PRICE | UNITS IN-STOCK | UNITS ON-ORDER | REORDER | DISCONTINUED |
|---|---|---|---|---|---|---|---|---|---|
| 1 | CHAI | 1 | 1 | 10 BOXES X20 BAGS | 18,00 | 39 | 0 | 10 | FALSE |
| 2 | CHANG | 1 | 1 | 24 - 12 OZ BOTTLES | 19,00 | 17 | 40 | 25 | FALSE |
| 3 | ANISEED SYRUP | 1 | 2 | 12 - 550 ML BOTTLES | 10,00 | 13 | 70 | 25 | FALSE |
| 4 | CHEF ANTON'S CAJUN SEASONING | 2 | 2 | 48 - 6 OZ JARS | 22,00 | 53 | 0 | 0 | FALSE |
| 5 | CHEF ANTON'S GUMBO MIX | 2 | 2 | 36 BOXES | 21,35 | 0 | 0 | 0 | TRUE |
| 6 | GRANDMA'S BOYSENBERRY SPREAD | 3 | 2 | 12 - 8 OZ JARS | 25,00 | 120 | 0 | 25 | FALSE |
| 7 | UNCLE BOB'S ORGANIC DRIED PEARS | 3 | 7 | 12 - 1 LB PKGS. | 30,00 | 15 | 0 | 10 | FALSE |
| 8 | NORTHWOODS CRANBERRY SAUCE | 3 | 2 | 12 - 12 OZ JARS | 40,00 | 6 | 0 | 0 | FALSE |
| 9 | MISHI KOBE NIKU | 4 | 6 | 18 - 500 G PKGS. | 97,00 | 29 | 0 | 0 | TRUS |
| 10 | IKURA | 4 | 8 | 12 - 200 ML JARS | 31,00 | 31 | 0 | 0 | FALSE |
| 11 | QUESO CABRALES | 5 | 4 | 1 KG PKG. | 21,00 | 22 | 30 | 30 | FALSE |
| 12 | QUESO MANCHEGO LA PASTORA | 5 | 4 | 10 - 500 G PKGS. | 38,00 | 86 | 0 | 0 | FALSE |
| 13 | KONBU | 6 | 8 | 2KG BOX | 6,00 | 24 | 0 | 5 | FALSE |
| 14 | TOFU | 6 | 7 | 40 - 100 G PKGS. | 23,25 | 35 | 0 | 0 | FALSE |

FIG. 7

| PRODUCT ID | PRODUCT NAME | SUPPLIER ID | CATEGORY ID | QUANTITY PER UNIT | UNIT PRICE | UNITS IN-STOCK | UNITS ON-ORDER | REORDER | DISCONTINUED |
|---|---|---|---|---|---|---|---|---|---|
| 1 | CHAI | 1 | 1 | 10 BOXES X20 BAGS | 18,00 | 39 | 0 | 10 | FALSE |
| 2 | CHANG | 1 | 1 | 24 - 12 OZ BOTTLES | 19,00 | 17 | 40 | 25 | FALSE |
| 3 | ANISEED SYRUP | 1 | 2 | 12 - 550 ML BOTTLES | 10,00 | 13 | 70 | 25 | FALSE |
| 4 | CHEF ANTON'S CAJUN SEASONING | 2 | 2 | 48 - 6 OZ JARS | 22,00 | 53 | 0 | 0 | FALSE |
| 5 | CHEF ANTON'S GUMBO MIX | 2 | 2 | 36 BOXES | 21,35 | 0 | 0 | 0 | TRUE |
| 6 | GRANDMA'S BOYSENBERRY SPREAD | 3 | 2 | 12 - 8 OZ JARS | 25,00 | 120 | 0 | 25 | FALSE |
| 7 | UNCLE BOB'S ORGANIC DRIED PEARS | 3 | 7 | 12 - 1 LB PKGS. | 30,00 | 15 | 0 | 10 | FALSE |
| 8 | NORTHWOODS CRANBERRY SAUCE | 3 | 2 | 12 - 12 OZ JARS | 40,00 | 6 | 0 | 0 | FALSE |
| 9 | MISHI KOBE NIKU | 4 | 6 | 18 - 500 G PKGS. | 97,00 | 29 | 0 | 0 | TRUE |
| 10 | IKURA | 4 | 8 | 12 - 200 ML JARS | 31,00 | 31 | 0 | 0 | FALSE |
| 11 | QUESO CABRALES | 5 | 4 | 1 KG PKG. | 21,00 | 22 | 30 | 30 | FALSE |
| 12 | QUESO MANCHEGO LA PASTORA | 5 | 4 | 10 - 500 G PKGS. | 38,00 | 86 | 0 | 0 | FALSE |
| 13 | KONBU | 6 | 8 | 2KG BOX | 6,00 | 24 | 0 | 5 | FALSE |
| 14 | TOFU | 6 | 7 | 40 - 100 G PKGS. | 23,25 | 35 | 0 | 0 | FALSE |

FIG. 9

CONFIGURE: "My Processed Delivery Notes"

General ← 1301

Dynamic Data

Navigation

INSTANCE ID:

Title:
My Processed Delivery Notes

Subtitle:
D9P

Keywords:

Icon:

Information:

Number Unit:

Service URL:

Refresh Interval in Seconds:
0

Use semantic object navigation:
☑ ← 1303

Semantic Object
Z_BC ← 1305

Action
display

Parameters: ← 1307
nodeld=PSD1_DELIV_PROC_ME&wobjType=PS01_MY_DEL

Target URL: ← 1309
Z_BC display?nodekl=PS01_DELIV_PROC_ME&wobjType:

Tile Actions

| ☐ | Menu Item | Target: T... | Navigation Target: | Action |
|---|---|---|---|---|
| ☐ | | URL ▾ | | |

Add | Remove

| Title | Semantic Object | Action | Parameters | Target URL |
|---|---|---|---|---|
| PF99 Test V=2 | Z_BC | display_old | nodeId=PF99_TEST&wobjType=PF99_TEST&system=D9d&workplaceId=PF99_TEST | #Z_BC-display_old?nodeId=PF99_TEST&wobjType=PF99_TEST&system=D9d&workplaceId=PF99_TEST |
| Incoming Order | Z_BC | display | nodeId=PS02_ORDER_INBOX&wobjType=PS02_PRC_ORDER&system=D9P&workplaceId=WP_INBOX | #Z_BC-display?nodeId=PS02_ORDER_INBOX&wobjType=PS02_PRC_ORDER&system=D9P&workplaceId=WP_INBOX |
| Delivery Notes | Z_BC | display | nodeId=PS01_DELIVERY_INBOX&wobjType=PS01_PRC_DELIV&workplaceId=WP_INBOX&system=D9P | #Z_BC-display?nodeId=PS01_DELIVERY_INBOX&wobjType=PS01_PRC_DELIV&workplaceId=WP_INBOX&system=D9P |
| HR Documents | Z_BC | display | nodeId=PS05_HR_INBOX&wobiType=PS05_PRC_HR&workplaceId=WP_INBOX&system=D9P | #Z_BC-display?nodeId=PS05_HR_INBOX&wobiType=PS05_PRC_HR&workplaceId=WP_INBOX&system=D9P |
| My Processed Incoming Order | Z_BC | display | nodeId=PS02_ORDER_PROC_ME&wobjtype=PS02_MY_ORDER&workplaceId=WP_INBOX&system=D9P | #Z_BC-display?nodeId=PS02_ORDER_PROC_ME&wobjtype=PS02_MY_ORDER&workplaceId=WP_INBOX&system=D9P |
| My Processed Delivery Notes | Z_BC | display | nodeId=PSD1_DELIV_PROC_ME&WobiType=PS01_MY_DELIV&WorkplaceId=WP_INBOX&system+D9P | #Z_BC-display?nodeId=PSD1_DELIV_PROC_ME&WobiType=PS01_MY_DELIV&WorkplaceId=WP_INBOX&system+D9P |

FIG. 13B

CONFIGURE: "Business Center" — 1400

INSTANCE ID:

Intent

Semantic Object: Z_BC

Action: display

Target

Application Type: SAPUI5 Fiori App

Type: Business Center

URL:

ID:

General

Information:

Device Types: Desktop  ☑ Tablet  ☑ Phone

Parameters:

| Name | Mandatory | Value | Is Regular Expression | Default Value | Target N... |
|------|-----------|-------|-----------------------|---------------|-------------|
| No data | | | | | |

☑ Allow additional parameters

Add   Delete

FIG. 14

SUPPLIERS DETAILS

Aux joyeux acclesiastiques    PARTS        SHOW PRODUCTS    EDIT PRODUCTS

JOHN DOE                                                    SALES MANAGER

MY DATA

CONTACT NAME: JOHN DOE
CONTACT TITLE: SALES MANAGER
PHONE: (1) 00 55 00 66

FIG. 18A

| 29 | 8 | 77 | | 69 | | 77 |
|---|---|---|---|---|---|---|
| SUPPLIERS | INACTIVE PRODUCTS | PRODUCTS W SUPPLIERS | | ACTIVE PRODUCTS | | |
| Search in Object ID 🔍 ⌄ | | | | | | |
| Company Name | | City | | | | Boolean |
| Aux joyeux ecclesiastiques | | Paris | | | | |
| Bigfoot Breweries | | Bend | | | | ⌄ |
| Cooperative de Quesos 'Las Cabras' | | Oveido | | | | ⌄ |
| Escargots Nouveaux | | Moniceau | | | | ⌄ |
| Exotic Liquids | | London | | | | ⌄ |
| Formaggi Fortini s.r.l | | Ravenna | | | | ⌄ |
| Forêts d'erables | | Ste-Hyacinthe | | | | ⌄ |
| G'day, Mate | | Sydney | | | | ⌄ |
| Gai Paturage | | Annecy | | | | ⌄ |
| Grandma Key's Homestead | | Ann Arbor | | | | ⌄ |
| He Süßwaren GmbH & Co. KG | | Berlin | | | | ⌄ |
| Karkki Oy | | Lappeenranta | | | | ⌄ |
| Leka Trading | | Singapore | | | | ⌄ |
| Lyngbysild | | Lyngby | | | | ⌄ |
| Ma Maison | | Montreal | | | | ⌄ |
| Mayumi's | | Osaka | | | | ⌄ |
| New England Seafood Cannery | | Boston | | | | ⌄ |
| New Orleans Cajun Delights | | New Orleans | | | | ⌄ |

| Search in Sales... | Currency | Sales Org. | | | | ⇅ |
|---|---|---|---|---|---|---|
| Sales Org. | Name | Minimum Value | Maximum Value | Currency | Edit | Delete |
| 0006 | USA Philadelphia | 333,00 | 333,333,00 | EUR | ✎ | 🗑 |
| 2000 | UK HealthrowHayes | 1,000,00 | 100,000,00 | EUR | ✎ | 🗑 |
| 2220 | France Paris | 1,000,00 | 100,000,00 | EUR | ✎ | 🗑 |

| Refer | | | |
|---|---|---|---|
| Select Role: First Level ⌄ | | | |
| Last name | First name | User name | Department |
| ☑ AKOESTLI | | AKOESTLI | |
| ☑ Tester | BC | BC_TEST | |
| ☑ CNICKLAS | | CNICKLAS | |
| ☑ FSTEPHEN | | FSTEPHEN | |
| ☑ Malenke | Markus | MARKUSMA | |
| ☑ OTBCWUI_TEST | | OTBCWUI_TEST | |
| ☑ RUPERTM | | RUPERTM | |
| ☑ Witt | Thomas | TWITT | |
| Enter a comment (required) | | | |
| | | Refer | Cancel |

2300

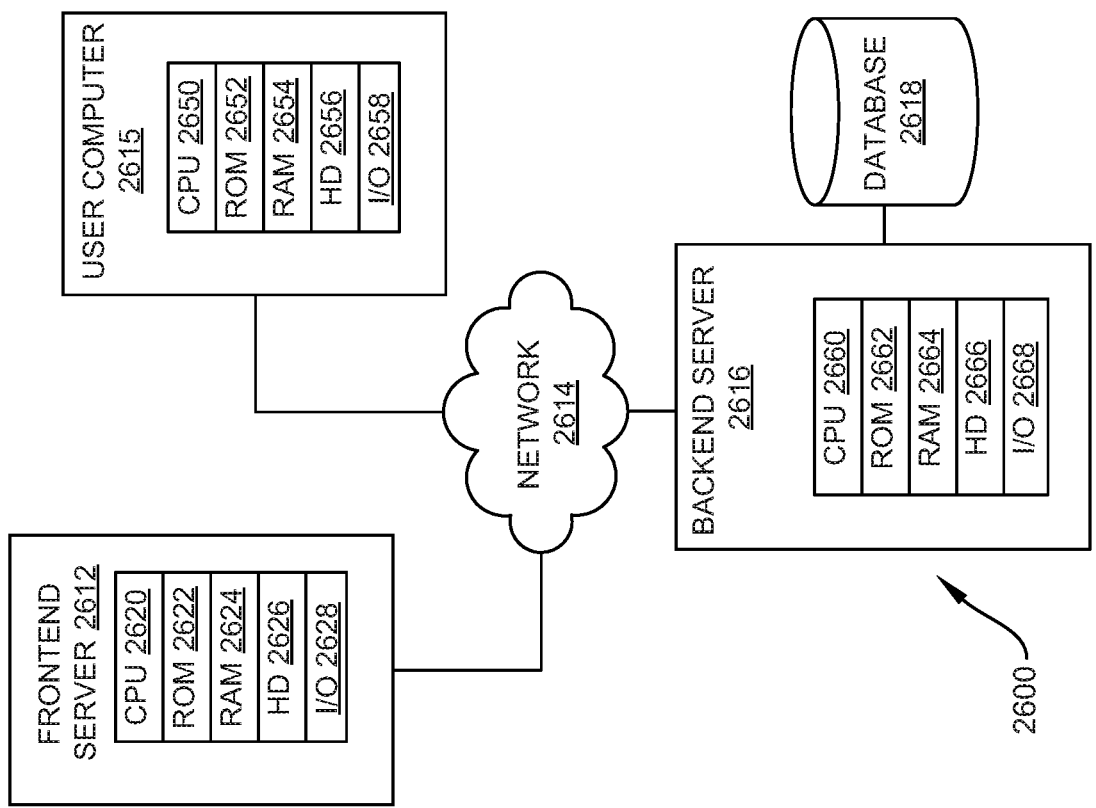

UNIVERSAL APPLICATION FRAMEWORK FOR STREAMLINED FRONTEND DEVELOPMENT OF USER INTERFACE

CROSS-REFERENCE TO RELATED APPLICATION(S)

This is a continuation of U.S. patent application Ser. No. 16/168,425, filed Oct. 23, 2018, entitled "UNIVERSAL APPLICATION FRAMEWORK FOR STREAMLINED FRONTEND DEVELOPMENT OF USER INTERFACE APPLICATIONS," issued as U.S. Pat. No. 11,200,034, which claims a benefit of priority under 35 U.S.C. § 119(e) from U.S. Provisional Application No. 62/575,617, filed Oct. 23, 2017, entitled "UNIVERSAL APPLICATION FRAMEWORK FOR STREAMLINED FRONTEND DEVELOPMENT OF USER INTERFACE APPLICATIONS." This application relates to U.S. patent application Ser. No. 16/414,569, filed May 16, 2019, entitled "UNIVERSAL APPLICATION FRAMEWORK FOR STREAMLINED FRONTEND DEVELOPMENT OF USER INTERFACE APPLICATIONS," which also claims a benefit of priority under 35 U.S.C. § 119(e) from U.S. Provisional Application No. 62/575,617, filed Oct. 23, 2017, entitled "UNIVERSAL APPLICATION FRAMEWORK FOR STREAMLINED FRONTEND DEVELOPMENT OF USER INTERFACE APPLICATIONS." All applications listed in this paragraph are incorporated by reference herein for all purposes.

TECHNICAL FIELD

This disclosure relates generally to application frameworks running on networked computer systems. More particularly, this disclosure relates to a new universal application framework useful for easily, quickly, and efficiently developing purposeful user interface applications such as role-based or task-centric applications that can be useful for performing various tasks in enterprise computing environments.

BACKGROUND OF THE RELATED ART

A role-based user experience (UX) technology provides many advantages. For example, enterprise users can have a single access point to launch multiple role-based, task-centric applications (referred to herein as purpose-specific apps) based on their roles. Further, since such purpose-specific apps can be written (e.g., using HTML5 web development standards known to those skilled in the art) to run in web browsers, enterprise users can run them across device platforms and operating systems. That is, purpose-specific apps can be platform-, device-, and deployment-agnostic. Accordingly, a user can, for example, start a process on a desktop computer or work station, continue that process on a smart phone or tablet, and then complete the process on a laptop computer. SAPUI5 (which includes guidelines and tools such as predefined UX patterns for building purpose-specific apps) is an example of a role-based UX technology.

Purpose-specific apps are generally small and lightweight in size relative to powerful, large-scale enterprise systems that support complicated business processes, information flows, reporting, and data analytics in complex organizations. For example, an enterprise resource planning system (ERP) typically integrates software applications and processes such as purchasing, finance, human resources, and inventory management. Following a different design paradigm, the role-based UX technology decomposes software applications and processes into individual role-based or task-based, purpose-specific apps. This allows each purpose-specific app to present highly relevant and focused content to each user and to provide a fast application response time and fast query execution time.

While the role-based UX technology and purpose-specific apps built on the role-based UX technology can provide many benefits such as those mentioned above, they are not without drawbacks. For example, as an enterprise continues to grow, it may generate new roles and/or need additional tasks performed. This creates a scalability problem and potentially loses efficiency and effectiveness as the number of purpose-specific apps that must be built for the new roles, tasks, and/or business processes continues to grow, sometimes exponentially. Even though a purpose-specific app can be built with as little as three screens for one use case per role, when the number of purpose-specific apps needed is scaled up to multiple orders of magnitude, the amounts of time, costs, and resources (e.g., hardware resources, software resources, human resources, etc.) needed to develop them can be very significant which, in turn, can severely impact the overall system performance.

Further, purpose-specific apps are built separately for different purposes, each driven by a specific task. That is, in the role-based UX technology, purpose-specific apps have a one-to-one relationship with the tasks for which they are built. By design, purpose-specific apps are not integrated and each runs independently of another. That is, a task is not permitted to drive or trigger another task. This means that data created or updated by one purpose-specific app will not automatically be reflected in real time in another purpose-specific app. For example, an enterprise user in charge of processing purchase orders and invoices may utilize a purchase order app to process purchase orders and uses an invoice processing app to process invoices. When a purchase order has been filled, the purchase order app may operate to update a database record to mark the status of the purchase order as "complete." However, because the purchase order app operates independently of the invoice processing app, this update is not automatically communicated to the invoice processing app in real time and hence, the invoice for the purchase order will not be automatically processed by the invoice processing app. That is, the completion of one task (e.g., purchase order processing) will not drive or trigger another task (e.g., invoice processing). Suppose there are dozens, if not hundreds, of processes in the enterprise, the potential loss of efficiency/effectiveness contributed by such purpose-specific apps can be quantifiably huge.

Another area of potential loss of efficiency/effectiveness can be attributed to overlapping operations performed by the task-centric, purpose-specific apps. While their purposes may be different, they may operate on the same database, same or overlapping data records, same or overlapping data fields, etc., and thus they may perform overlapping and/or duplicative operations such as searching, accessing, and querying a database, retrieving database record(s), update/storing data in the database, etc., through the same or similar user interface elements or menu items. For example, while two purpose-specific apps may be built for different purposes, they may both have an inbox and a search field. Again, when scaled up, such overlapping in functions can undesirably affect the overall system performance.

SUMMARY OF THE DISCLOSURE

Embodiments disclosed herein can address the aforementioned drawbacks and provide additional technical solutions and benefits. An object of the invention is to provide a universal application framework that can leverage the benefits provided by task-centric, purpose-specific apps and that also can address the huge potential loss of efficiency/effectiveness caused by such task-centric, purpose-specific apps.

Conceptually, a universal application framework can comprise a universal frontend interface, a universal backend interface, and a powerful configuration layer between the universal frontend interface and the universal backend interface. In some embodiments, the universal application framework comprises a "generic" application with perspective-driven application parts and non-perspective driven application parts, and a unique user interface (UI) modeling tool referred to herein as a "perspective editor" for creating and maintaining perspectives. The perspective editor can itself be an UI application that is built using the universal application framework.

The perspective-driven application parts can be fully configurable by UI designers without requiring them to apply complex coding and/or in-depth programming knowledge of the backend systems where the actual data is stored and maintained. Applications built using the universal application framework disclosed herein are referred to herein as purposeful UI applications ("UI apps"). Unlike conventional purpose-specific apps, UI apps thus developed can be launched via the same target mapping which points to a technical application component (referred to herein as a "solution application") of a frontend server of the universal application framework. The technical application component can provide action and navigation information for a part of the UI apps not specific to any purpose. A perspective is bound to logical entities such as a node representing rows from a table. The perspective can have a perspective type and a data view of the rows from the table in a layout. The perspective type controls which data view is usable in the perspective.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 2 is a flow chart illustrating an example of a runtime operation according to some embodiments.

FIG. 3 is a flow chart illustrating an example of a mapping process according to some embodiments.

FIG. 4 is a flow chart illustrating an example of a process for creating or configuring a perspective according to some embodiments.

FIG. 7 depicts an example type of logical entities that can be defined to be filled with data directly from a table or tables according to some embodiments.

FIG. 9 depicts another example type of logical entities according to some embodiments.

FIG. 13A depicts a diagrammatic representation of an example of configuring a block for launching a UI app with application parameters that reference a perspective according to some embodiments.

FIG. 13B depicts a diagrammatic representation of an example of a plurality of UI apps having the same target mapping and different parameters referencing different perspectives according to some embodiments.

FIG. 14 depicts a diagrammatic representation of an example of configuring a target mapping including the referenced technical application component and semantic object with its action according to some embodiments.

FIGS. 18A-18B depict a diagrammatic representation of an example of a UI app according to some embodiments.

FIG. 19 depicts a diagrammatic representation of another example of a UI app according to some embodiments.

FIG. 20 depicts a diagrammatic representation of an example of a UI app having a non-perspective-driven part and a perspective-driven part according to some embodiments.

FIG. 22 depicts a diagrammatic representation of an example of a UI app with customizable screen appearance according to some embodiments.

FIG. 23 depicts a diagrammatic representation of an example of a layout arrangement according to some embodiments.

FIG. 26 depicts a diagrammatic representation of a distributed network computing environment where embodiments disclosed can be implemented.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
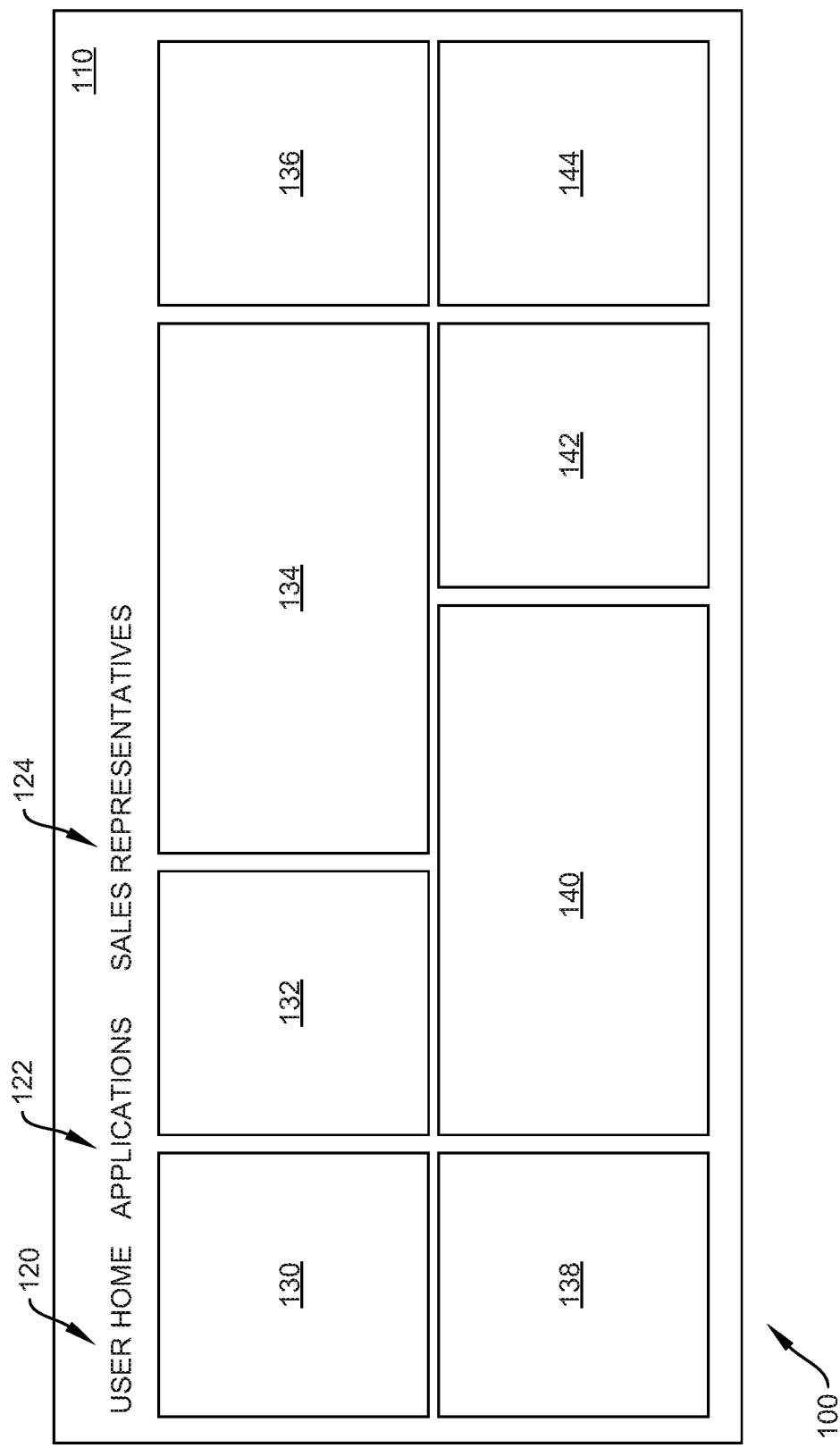
FIG. 1 depicts a diagrammatic representation of an example of a home page showing role-based applications.

FIG. 1 depicts a diagrammatic representation of an example of a home page showing role-based applications. In the example of FIG. 1, home page application 100 provides home page 110 for launching any of purpose-specific apps 122 represented by blocks 130-144 for enterprise user 120. In this disclosure, a "block" is not an application in a technical sense. Rather, in this disclosure, a block represents a launch object for an application that can be organized in, for instance, catalogs which are assigned to users and/or groups. A "home page," in this sense, displays all the block catalogs that are assigned to a certain user (which, in the example of FIG. 1, is represented by enterprise user 120). Home page 110 may contain multiple blocks or a block, each representing a purpose-specific application 122 specifically written or otherwise coded for a single purpose, for instance, for role 124 in an enterprise, a specific function or task for the role, etc. Such purpose-specific apps may correspond to or serve business functions particular to an enterprise. Examples of purpose-specific apps may include work approval apps, financial apps, calculation apps, various self-service apps, and so on.

Home page 110 can be configured to display different sets of purpose-specific apps 122 for different enterprise users 120 (e.g., employees, managers, contractors, vendors, etc. associated with a particular enterprise), depending upon their respective roles in the enterprise. For example, when an employee logs in, home page application 100 may, based on the employee's role 124 in the enterprise, display two blocks representing two purpose-specific apps 122, one for a "leave request" app and one for an "employee benefit" app, on home page 110. However, when a manager logs in, home page application 100 may, based on the manager's role in the enterprise, display blocks for different purpose-specific apps 122, for instance, a "leave approval" app and a "timesheet approval" app, that would be useful to the manager. As a non-limiting example, home page application 100 may be a browser-based application built using the Advanced Business Application Programming (ABAP) created by the German software company SAP SE which is part of the NetWeaver platform—a solution stack of SAP's technology products.

As discussed above, this one-to-one relationship between a purpose-specific app and the specific purpose for which it is built can have drawbacks in some cases. Embodiments disclosed herein provide a universal application framework that can address these drawbacks and provide additional technical solutions and benefits.

Generally, an application framework refers to a software library or software framework that provides a generic code structure to support the development of applications for a computing environment or software platform. However, unlike a generic application framework that can be used to build all kinds of applications that run on a particular software platform, the new universal application framework disclosed herein is particularly built for efficiently, quickly, easily, and flexibly creating purposeful UI apps that can leverage the aforementioned role-based US technology as well as complex document management capabilities such as attaching a document to a workflow or process. According to an aspect of the invention, the technical description of an UI app is a set of parameters (referred to herein as "application parameters") that specifies an application mode and logical entities for the UI app. The logical entities further determine what perspective(s) is/are involved for the UI app, what action(s) is/are available for the UI app, and what navigation options does the UI app have. Logical entities thus configured for an UP app are stored as application configuration.

As also discussed above, conventional purpose-specific apps built on role-based UX technology are small, lightweight role-based, task-centric applications, each typically defined for one role, one task, and three screens. They do not provide complex document management capabilities provided by complex enterprise systems such as an Enterprise Resource Planning (ERP), customer relationship management (CRM), product lifecycle management (PLM), etc. that operate at the backend of an enterprise computing environment. Such purpose-specific apps, which run at the frontend, can have development environments, coding languages, rules, and implementation requirements that are very different from those for enterprise systems that run at the backend. As such, UI designers and enterprise system developers have very different skillsets, possess very different technical knowledges, and utilize very different tools.

UI apps that are built using the universal application framework disclosed herein can be launched the same way as purpose-specific apps, for example, from an enterprise user's home page (e.g., home page 110 shown in FIG. 1). This example leverages the SAP Launchpad infrastructure which provides "semantic objects" and "actions" for launching purpose-specific apps. In the SAP Launchpad infrastructure, a "semantic object" represents a business entity such as a customer, a purchase order, or a product, while an "action" describes which operation (e.g., display) is intended to be performed on a semantic object (e.g., "Product"). Skilled artisans appreciate that this example is meant to be non-limiting and that, in some embodiments, the SAP Launchpad infrastructure is not needed for launching UI apps that are built using the universal application framework. For example, a browser-based application could utilize the universal application framework without home page 110 or the SAP Launchpad infrastructure by directing a browser (within which the browser-based application is run) to a universal resource locator (URL) or network address that includes application parameters that reference certain logical entities defined in the universal application framework.

In the example of FIG. 1, an enterprise user may sign in to their home page and select a block representing a UI app particular to their role from the home page as before. Similar to launching a purpose-specific app, the SAP Launchpad infrastructure can resolve, from the provided semantic object and action through a target mapping mechanism, a technical application component that is to be loaded from the universal application framework. The target mapping mechanism and the technical application component are further described below.

FIG. 2 is a flow chart illustrating an example of runtime operation 200 according to some embodiments. As described in further details below, the universal application framework includes a universal frontend interface application. When the universal frontend interface application is started (e.g., responsive to a user selecting a block representing a UI app on home page 110 or responsive to a user directing a browser to a URL referencing logical entities defined in the universal application framework), it parses the application parameters (e.g., application parameters that are associated with the block that the user has selected from home page 110 or application parameters that are associated with the URL) (201) and, from the parsed application parameters, determines the application mode and the logical entities for a requested UI app (205). Next, any non-perspective driven parts of the requested UI app are instantiated, and the application configuration represented by the specified logical entities is fetched (210). From that configuration, the perspective for the initially selected item is derived and loaded (215).

As runtime operation 200 illustrates, the universal frontend interface application becomes a purpose-specific UI app by interpreting the provided application parameters at runtime. The application parameters steer the general mode of the UI app (e.g., Master-Detail, Full-Screen-List, or Object) and refer to logical entities that further define the UI app by describing the data to be displayed, available navigation options, and actions that can be applied to an item (object).

The logical entities represent the UI app configuration which is stored in the backend.

Every logical entity is bound to a specific part of the UI app. In some embodiments, logical entities can be defined as follows:
Item:
Describes one row of a table.
Represents a single selectable object in an application.
Work Object Type:
Describes a structure of the data (e.g., which tables, which fields, etc.).
Describes how the data is accessed at runtime (e.g. whether the data can directly be read from some data base tables, or the data is provided by a service).
Describes how a key for an item is build.
Describes applicable actions for an item (including navigation options).
Describes associations to one or more other Work Object Type(s) (e.g., parent-child relation).
Node:
Belongs to one instance of a Work Object Type.
Defines which rows to select from a data source (selection criteria).
Can include search fields, sort fields, and filter fields.
Can include a display definition of an item for the Master List in Master-Detail-Mode.
Can include a display definition of an item for the Full Screen List in Full-Screen-Mode.
Workplace:
A grouping mechanism for grouping various node instances to form a solution.

Depending on the application mode, the universal frontend interface application supports different hierarchical entry points represented by the following logical entities:

| Application Mode: | Master-Detail | Full-Screen-List | Object |
|---|---|---|---|
| Entry Point(s): | Node | Workplace or Node | Item |

For places in a UI app where a high flexibility regarding layout and shown data is required, the universal frontend interface application can embed perspectives. Each place corresponds to a specific perspective type and has its own set of data views. A perspective is always bound to an instance of the logical entity "Work Object Type." From that configuration object, the available fields for data binding and further associations can be derived.

A perspective can have several layout containers in which one or more data views are arranged. The data views and textual properties of layout containers become connected to a data source via the data binding mechanism. For a property binding, one of the available fields from the work object type, for which the perspective has been created, can be chosen. This kind of binding is read-only. The binding for a data view is specific to its characteristics and includes more than a simple field selection. For a table data view, for example, it must be specified which fields are included in the mandatory columns, which are free to choose, what can be edited, and whether there are related fields or if a selection event should be enabled. The selection event allows data views to have a parent-child relation.

In cases where the SAP Launchpad infrastructure is used to launch an UI app, the block representing the UI app is configured with application parameters (that reference the logical entities, a semantic object, and an action) from which the technical application component can be resolved through target mapping. FIG. 3 is a flow chart illustrating an example of block creation process 300 according to some embodiments.

While the target mapping for all UI app blocks in a solution (e.g., a document-centric solution for product management, human resource, etc.) is the same, the application parameters are different. Block creation process 300, which can be performed by a home page designer, may entail creating and configuring a block (which represents a UI app for a purpose or a task) with the target mapping that points to the universal frontend interface application of the universal application framework and specifying the semantic object and action for the block to link the block with the target mapping (301). This can be done for each block representing a UI app in a solution so that the blocks representing all the UI apps in the solution are target-mapped to point to the same universal frontend interface application of the universal application framework. The home page designer can then set the application parameters that will be passed to the technical application component of the universal application framework (305). The application parameters specify the application mode and reference logical entities for the associated UI app. Once configured, a block configuration can include a textual description of the block, an icon for the block, a semantic object and associated action, and application parameters that are to be passed to the technical application component that is resolved from the semantic object and action.

As described above, the universal frontend interface application becomes a purpose-specific UI app as soon as the application parameters that refer to the logical entities are interpreted (205). Such a UI app can have fixed layout parts (e.g. the "inbox", search and filter functionality, navigation paths) and flexible layout parts that are driven by perspectives. The shown data for the fixed and flexible layout parts is steered by the logical entities configuration. This means that the general application structure (e.g., where search, filters, action are placed and possible navigations) is the same for all UI apps built/configured using the universal application framework and is implemented just once. It also ensures that the usability across different solutions is the same.

However, the UI apps can still be built for different purposes. This is done by referring to specific logical entities and perspectives. Each perspective can drive a layout that is specific to the UI app. Different UI apps in the same solution can have different application parameters referencing different perspectives for different perspective-driven parts of the UI apps. This is further explained below.

FIG. 4 is a flow chart illustrating an example of process 400 for creating or configuring a perspective according to some embodiments. A perspective refers to logical entities. Thus, to create or configure a perspective, the logical entities must first be created and/or configured (401). As described above, examples of logical entities can include work object types, nodes, workspace, etc.

Once logical entities are created and/or configured, a UI designer can create or model a perspective to bind a logical entity or logical entities (405). In embodiments disclosed herein, this is done using a perspective editing tool running on the frontend server in the enterprise computing environment. In some embodiments, the perspective editing tool can be configured for providing a tree view section, a views section, a layout containers section, and a properties section.

The tree view section can provide a structural view of the perspective, showing any layout container and any data view associated with the perspective arranged in a hierarchical tree. The views section can provide data views that can be dragged and dropped into the hierarchical tree. These data views are associated with a perspective type such as item, action dialog, or field. The perspective type controls which data view is usable in a perspective. The layout containers section provides layout containers for building a layout in which a set of data views for the perspective is displayed. The properties section provides object-related properties for the perspective. These are further explained below.

The logical entities and the perspective thus created and/or configured can then be stored on the backend system in the enterprise computing environment (410).

As illustrated above, UI apps that are built using the universal application framework disclosed herein can be launched the same way as other purpose-specific apps. However, unlike other purpose-specific apps, UI apps that are built using the universal application framework disclosed herein can be configured by object type (which corresponds to a logical entity such as "WorkObjectType" at the backend), allowing document-centric solutions to be implemented in conjunction with the role-based UX technology.

To straddle two very different worlds at the frontend and the backend of an enterprise computing environment, architecturally, the universal application framework can be considered as having three main layers—a universal frontend interface to UI apps running at the frontend, a universal backend interface to complex backend systems operating at the backend, and a powerful configuration layer between the universal frontend interface and the universal backend interface. This is illustrated in FIG. 5.

Figure 5:
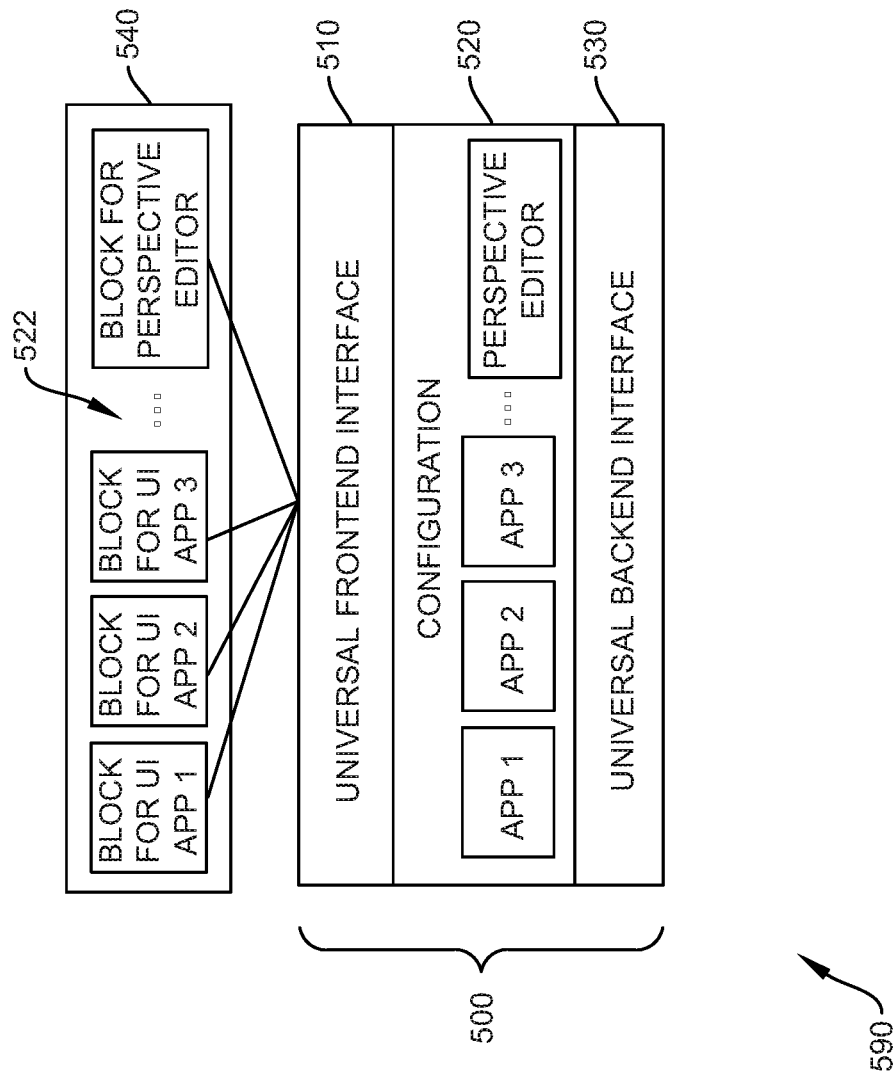
FIG. 5 depicts a diagrammatic representation of an architectural design of a universal application framework according to some embodiments.

In the example of FIG. 5, universal frontend interface or frontend framework 510 of universal application framework 500 provides a universal interface layer between configuration layer 520 and UI apps 522 (which, in this example, are represented by block for UI app 1, block for UI app 2, block for UI app 3, . . . , and block for a perspective editor) hosted by frontend server 540 in enterprise computing environment 590. In some embodiments, frontend framework 510 can be implemented as a universal frontend interface application running within a browser application on a user device. Universal backend interface or backend framework 530 of application framework 500 provides another universal interface layer between configuration layer 520 (where configuration for UI app 1, UI app 2, UI app 3, . . . , and the perspective editor take place) and, optionally, complex backend systems (e.g., data storage systems, enterprise systems, etc.) running on backend server(s) in enterprise computing environment 590.

These layers or components of universal application framework 500 can be implemented in various ways. An example is shown in FIG. 6.

Figure 6:
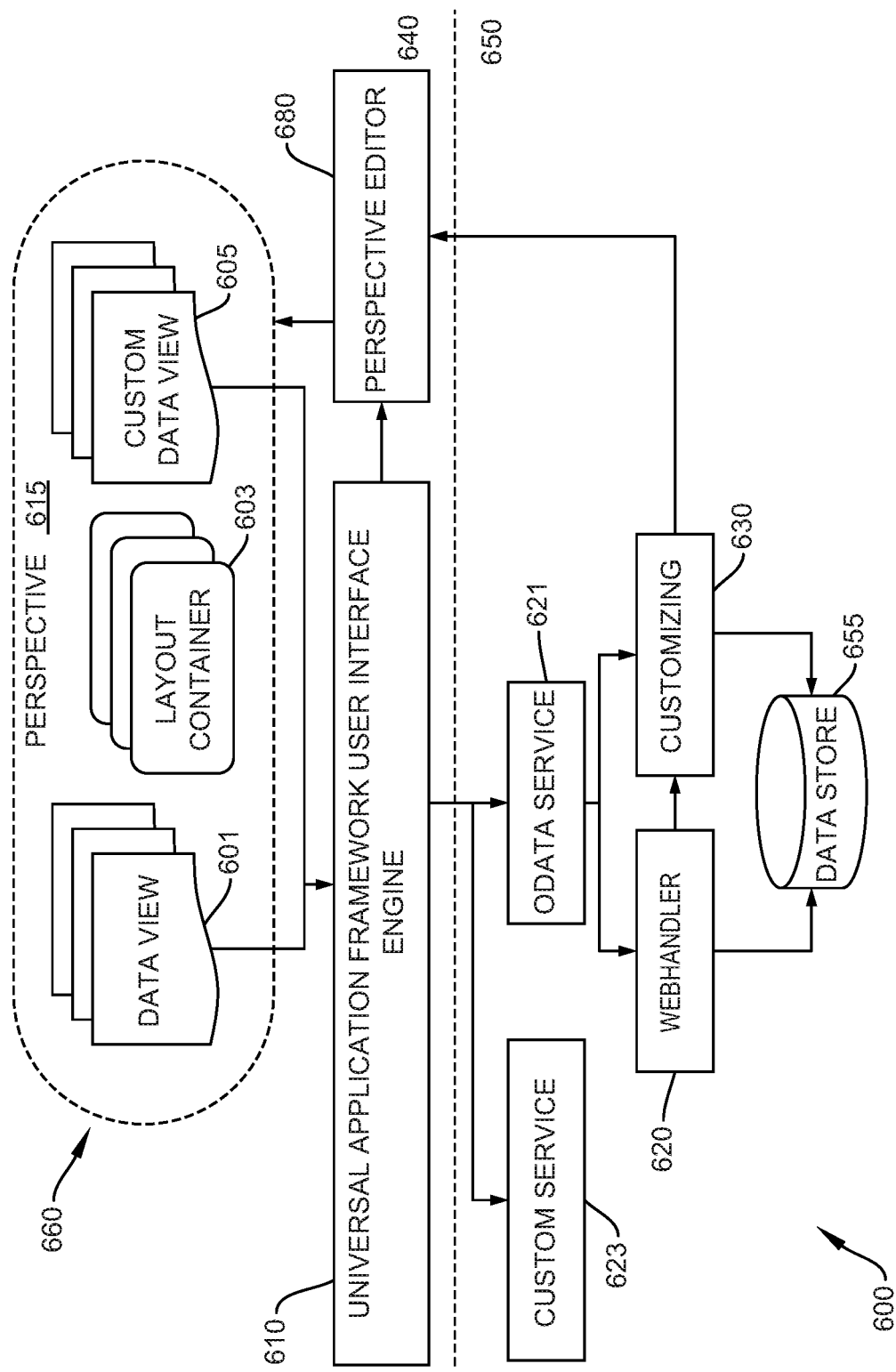
FIG. 6 depicts a diagrammatic representation of an example implementation of a universal application framework according to some embodiments.

In the example of FIG. 6, universal application framework 600 is implemented on frontend 640 and backend 650. Frontend 640 can include user devices and a frontend server hosting universal application framework UI engine ("UI engine") 610 and perspective editor 680, both of which can run within a browser application on a user device. Frontend 640 and backend 650 can be implemented on one or more server machines. Backend 650 can be configured for running customizing 630 and WebHandler 620. Backend 650 can also include data store 655 and any suitable enterprise systems such as an Enterprise Resource Planning (ERP) system, etc. (e.g., backend systems). Data store 655 can be any suitable data storage system(s) utilized by the backend systems.

UI engine 610, customizing 630, and WebHandler 620 can be considered universal application framework layers, with customizing 630 being part of the configuration layer of universal application framework 600. In some embodiments, perspective editor 680 can be created and/or configured using customizing 630. Perspective 615, which can be created and maintained using perspective editor 680, can host data view(s) 601, layout container(s) 603, and customer data view(s) 605 in data store 655 and fetched from backend 650 to frontend 640 at runtime 660 to populate UI apps that are built on the universal application framework and hosted on the frontend server.

Customizing 630 is a system configuration tool that allows a system administrator to instruct an application how to directly fetch data from a dedicated backend system, for instance, by providing a configured backend system alias in the frontend server, on which the application runs, as a universal resource locator (URL). This allows one frontend server to be connected with different backend systems. However, nodes cannot be aggregated from the connected backend systems. To address this issue, customizing 630 maintains a node customizing setting of logical systems describing how to aggregate nodes from different systems.

In some embodiments, UI engine 610 can be built to run in a browser using a JavaScript application framework such as OpenUI5. WebHandler 620 and customizing 630 may run on a backend server such as an ABAP server. UI engine 610 may communicate with WebHandler 620 and customizing 630 through a dedicated data service (e.g., OData service 621). UI engine 610 may also be accessible by way of custom service 623 (e.g., a service that is not configured by an administrator of the ABAP server using customizing 630).

While customizing 630 is a useful tool that can be used by system administrators to customize how their systems should operate, it is not meant for UI designers or frontend application developers. Accordingly, an object of the invention disclosed herein is to allow users (e.g., UI or frontend application developers, business users, enterprise users, etc.) who may not have in-depth programming knowledge of the backend systems to create, build, or modify frontend applications (e.g., purposeful UI apps) efficiently, quickly, and easily.

In some embodiments, this object is realized in a perspective editing tool configured for creating and maintaining perspectives that can then be used to efficiently, quickly, and easily build UI apps on a universal application framework. The perspective editing tool, which is also referred to herein as a perspective editor, has its own UI driven by a perspective (see below). As a non-limiting example, the functions of the perspective editor can be distributed on the ABAP platform (provided by SAP). For instance, the perspective tool may be implemented as a "Maintenance of Perspectives and Layouts" app accessible through the ABAP platform. As described below, UI designers can use the "Maintenance of Perspectives and Layouts" app to search perspectives and use the editing function to create and/or edit a perspective. The perspective editor is a powerful UI modeling tool for creating and editing purposeful UI "templates," binding data views to data in database tables, organizing and manipulating data views through logical entities and layouts, and so on.

Conventionally, UI templates are used to build web pages. Each such UI template may have form elements (e.g., buttons) or text that can be used to create a form which, in turn, can be used to create a basic form page with navigation. In this case, the purposeful UI "templates" are used to generate perspectives. Perspectives are a mechanism to bind certain logical entities to a set of data views in a particular layout in a manner that is controlled by the perspective type and decoupled from application logic and navigation.

Each perspective has data views, perspective layout containers, and possibly custom data views which can be generated by third parties and imported into the perspective editing tool. Certain data views can be visible to programmers and hidden from the administrators and users (e.g., UI designers). The universal application framework includes, in a developer guide, implementation instructions on how to make API calls to the system and how to create descriptors that the system expects for each imported custom data view.

In this disclosure, a perspective represents a flexible UI area for displaying/editing data. Each perspective is either bound to the logical entity "item" or "node." This data binding steers which data views can be used inside a specific perspective. The data carried out by a certain data view can be configured using the customizing tool. In this disclosure, a data view is a building block which cannot further be split.

Cascading Style Sheets (CSS) can be used to influence a data view's styling and arrangement. Typically, a perspective hosts several data views within a suitable layout. The layout can be built using available UI5 layout containers.

There are different types of logical entities. Examples of logical entities can include work object type, node, workplace, etc.

FIG. 7 depicts an example type of logical entities that can be defined to be filled with data directly from a table or tables according to some embodiments. As illustrated in FIG. 7, work object type logical entity 710 represents a data structure with fields that correspond to columns of table 700 where actual data resides. A work object type logical entity can be filled directly from one table or several tables via join constraints or dynamically via a data handler.

Figure 8B:
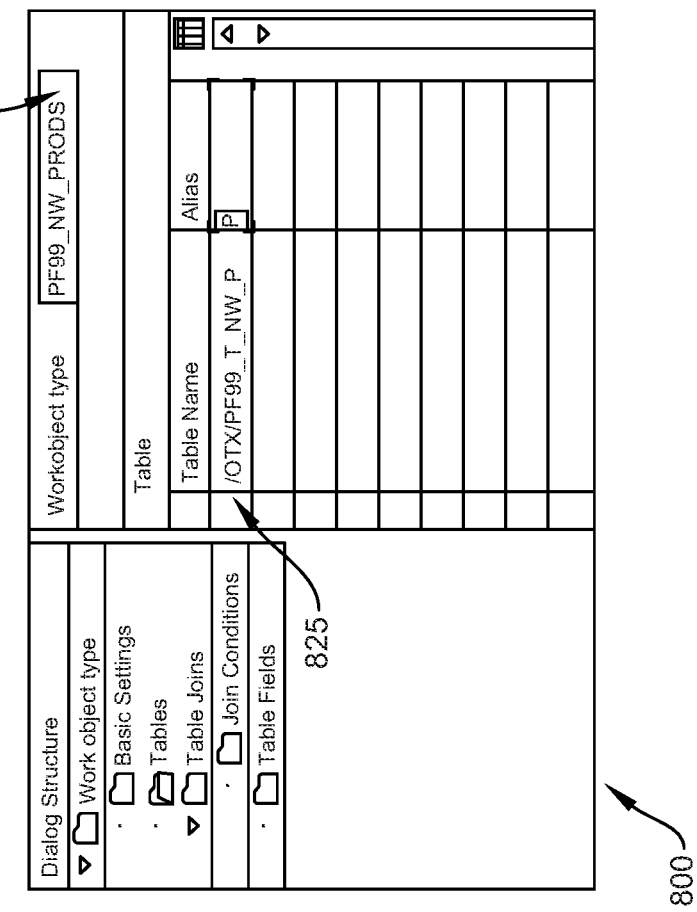
FIGS. 8A-8B depict an example of customizing logical entities according to some embodiments.
Figure 8A:
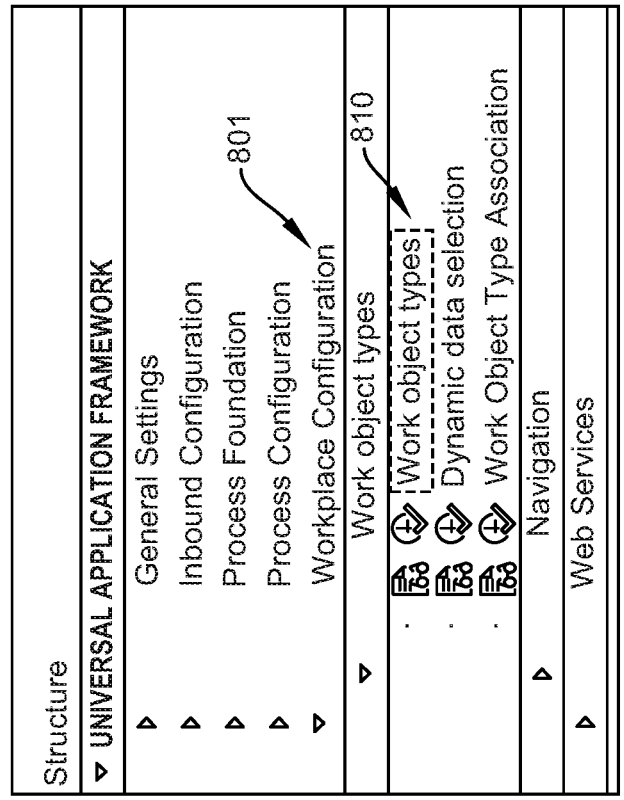

Logical entities can be created using the customizing tool. FIGS. 8A-8B depict diagrammatic representation of screenshots of an example of customizing 800. FIG. 8A depicts an example of configuring workplace logical entity 801 with work object type logical entities 810. FIG. 8B depicts an example of associating work object type logical entity 820 with table 825 using customizing 800.

FIG. 9 depicts another example type of logical entities according to some embodiments. As illustrated in FIG. 9, node 900 represents a selection of certain work object type logical entity 910. In this example, this selection is based on a value (e.g., "FALSE") of attribute 901 ("Discontinued") of work object type logical entity 910.

Figure 10A:
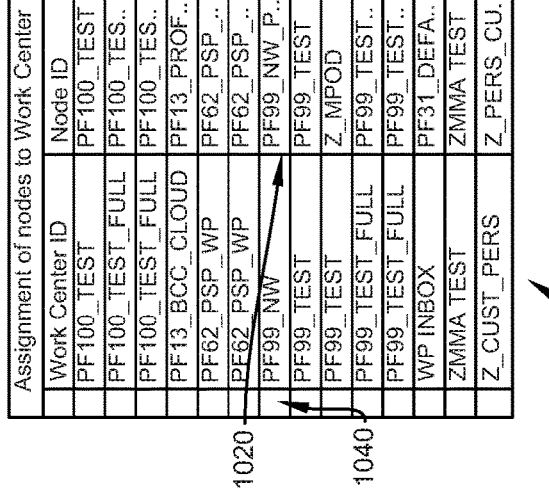
FIGS. 10A-10C depict an example of customizing logical entities according to some embodiments.
Figure 10B:
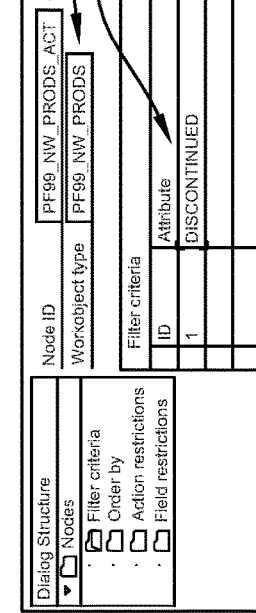
Figure 10C:
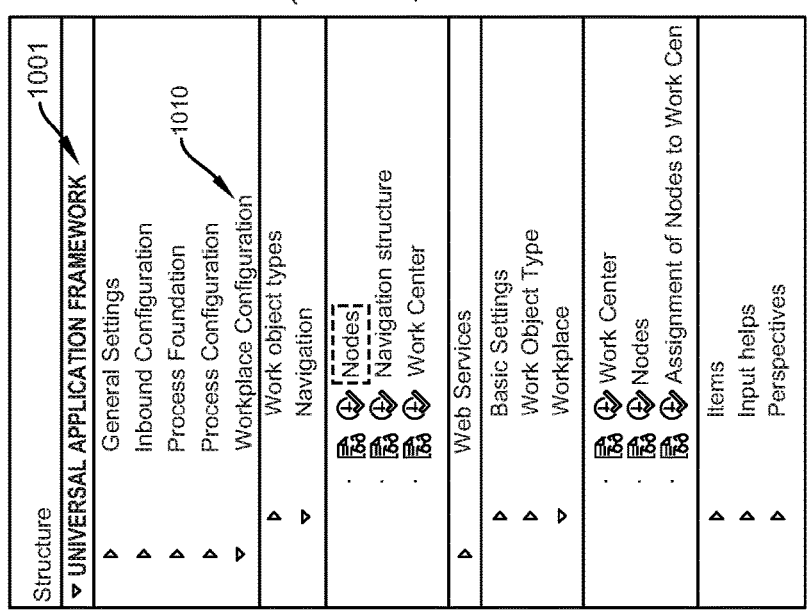

FIGS. 10A-10C depict an example of customizing logical entities using customizing 1000. In some embodiments, customizing is structured with universal application framework 1001 as a root node. As illustrated in FIG. 10A, various types of logical entities (e.g., workplace 1010) can be created, configured, and/or managed using customizing 1000. FIG. 10B depicts an example of node 1020 having work object type 1025 filtered by attribute 1021. FIG. 10C depicts an example of how node 1020, which references work object type 1025, can be assigned to workplace logical entity 1040 (named "Work Center" in FIG. 10C) using customizing 1000. A workplace logical entity can be used to assign or otherwise associate nodes (which, as discussed above, are another type of logical entities). From the UI point of view, a workplace is a one-level higher entry level compared to a node.

Figure 11:
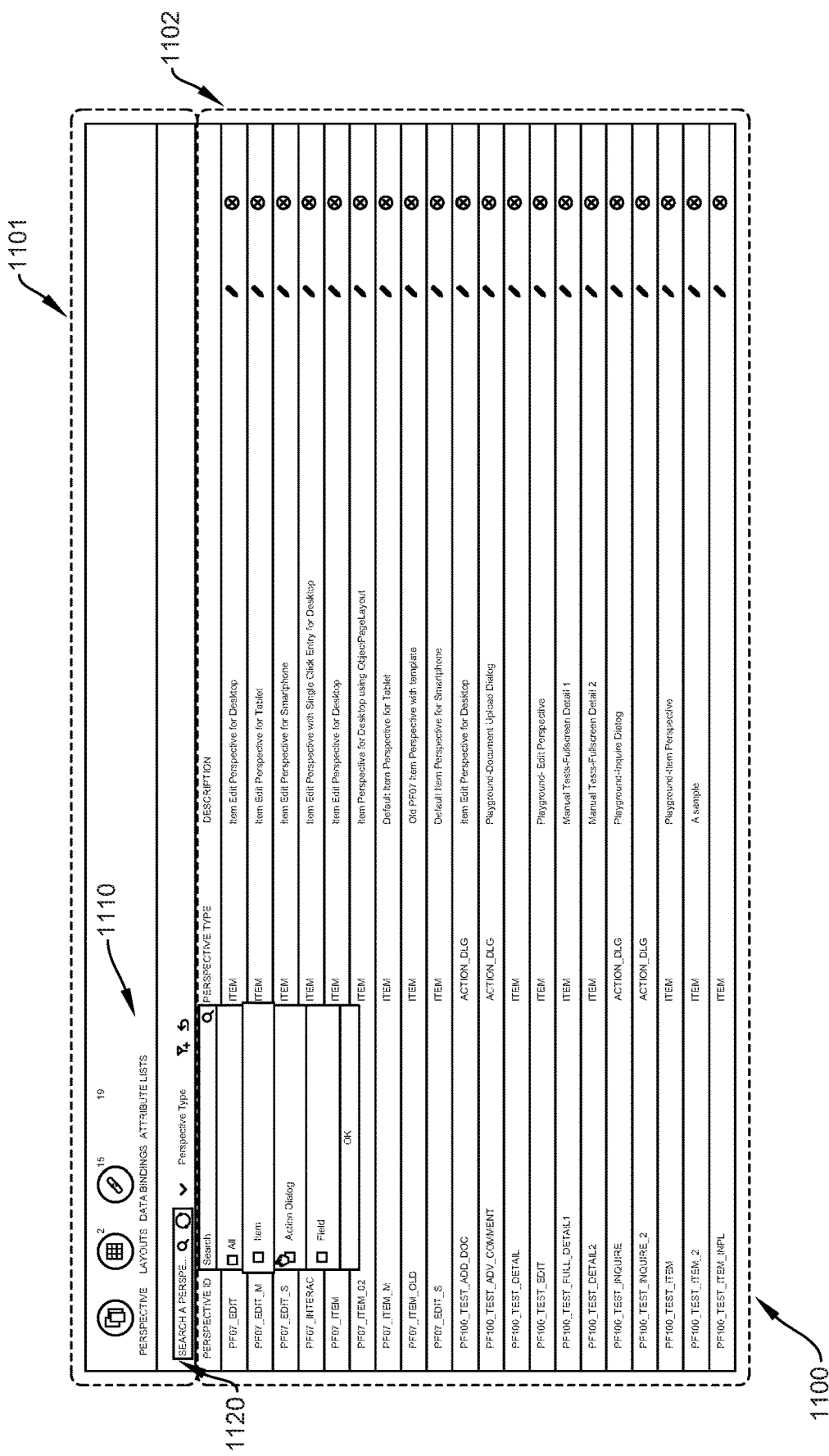
FIG. 11 depicts a diagrammatic representation of an example of a perspective editor showing a list of perspectives according to some embodiments.

As discussed above, in this disclosure, a perspective editor is a tool for creating and maintaining perspectives. FIG. 11 depicts a diagrammatic representation of an example of perspective editor 1100 showing a list of perspectives according to some embodiments. Each perspective is identified by a perspective identifier (ID) and has a perspective type and a brief description.

As illustrated in FIG. 11, perspective editor 1100 can include an UI app built using the universal application framework described above, with non-perspective driven part 1101 and perspective-driven part 1102. As illustrated in FIG. 11, non-perspective driven part 1101 can have a navigational element (e.g., menu 1110 with four nodes: "Perspective," "Layouts," "Data Bindings," and "Attribute Lists") and an action element (e.g., search function 1120). These elements can be provided by a technical application component (see, e.g., root node 1001) using a predefined pattern or fixed layout. The technical application component runs on the frontend server implementing the universal application framework. In this case, search function 1120 is configured (e.g., using the customizing tool) for searching perspectives by type (e.g., item, action dialog, or field).

Like any UI apps built using the universal application framework, perspective-driven part 1102 is driven by a perspective bound to logical entities (which have been created and/or configured using the customizing tool). The perspective and the logical entities are created and stored on a backend system and fetched to the frontend server when a UI designer starts up perspective editor 1100. In the example of FIG. 11, perspective-driven part 1102 is driven by a perspective bound to a workplace logical entity. This workplace has a particularly defined data view associated with database objects that can be retrieved from a perspective table or database. The data view specifies fields (e.g., perspective name, perspective type, description, etc.) and how they are to be displayed in perspective editor 1100. Another workplace may have a different set of nodes (e.g., perspective nodes, layout nodes, data binding nodes, etc.) and attribute list.

This is how logical entities are mapped to a UI app and there is always mapping between a logical entity and what is displayed on the UI. The workspace is the top level. Perspective editor 1100 is constructed in the full screen pattern such that when a UI designer logs in, the UI designer has a work center (a specially defined workspace logical entity) and, under the work center, the UI designer is presented with several nodes. Another example of a UI app with a full screen pattern is shown in FIG. 19. The number of nodes can be customizable using the customizing tool to view and/or configure the definition of the work center logical entity. The customizing tool enables its user to drill down into perspective nodes, view perspective IDs, perspective types, etc. Perspective names are also editable using the customizing tool. This is how perspective editor 1100 is instrumented. That is, the editing function of perspective editor 1100 is created using the customizing tool (by programmers with special knowledge on UI syntax, XML syntax, etc.) to make it easier for UI designers to fast-build a solution with UI apps.

Figure 12:
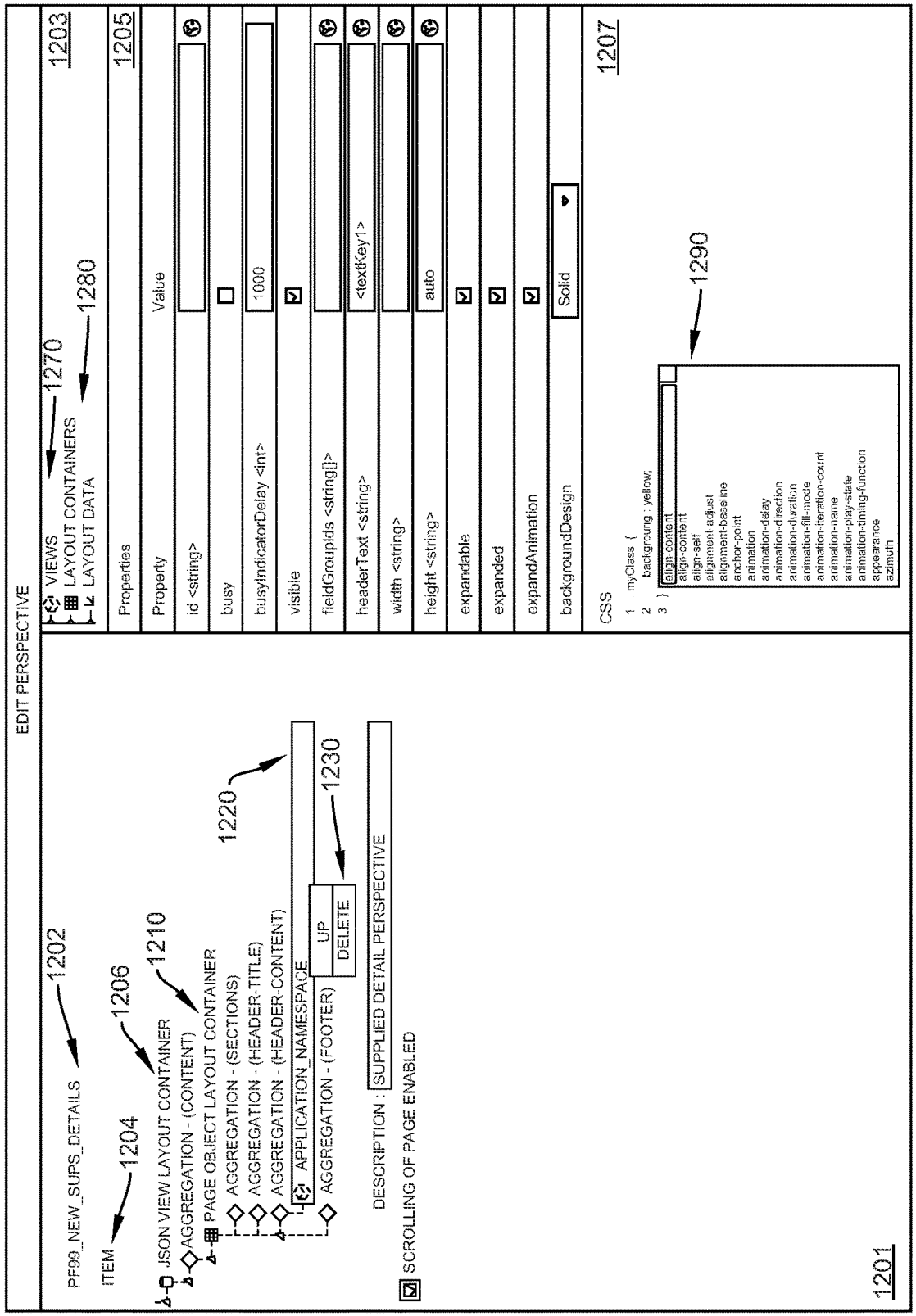
FIG. 12 depicts a diagrammatic representation of an example of perspective maintenance using a perspective editor according to some embodiments.

Perspective editor 1100 is configured for providing perspective-specific functions such as layouts, data bindings, attribute lists, as well as edit/delete functions. For example, a user can search perspectives by type or by name. Suppose the user enters "PF99" in search field 1120. In response, perspective editor 1100 is operable to return a list of perspectives (from the perspective table bound to the perspective that drives perspective-driven part 1102) that matched the search parameter "PF99," along with the respective perspective types and descriptions. Each perspective on the list has a name and a description, is of a perspective type, and can be viewed, edited, or deleted. When a perspective (e.g., a perspective called "PF99_NEW_SUPS_DETAIL") is clicked or otherwise selected for editing, perspective editor 1100 is operable to display the selected perspective in an editing mode. This is illustrated in FIG. 12.

In the editing mode (which is built using the customizing tool), the perspective editor can provide a plurality of functions in different sections 1201, 1203, 1205, 1207. Section 1201 can provide a tree view or a structural view of a perspective (e.g., perspective 1202 of type 1204). The tree view combines the layout information (e.g., layout containers 1206, 1210) with inserted data views (e.g., data view 1220).

A user of the perspective editor (e.g., a UI designer) can move the positions of any layout containers and data views, for instance, by dragging and dropping them in the tree view section and/or by right-clicking on a layout container or data view and selecting from popup menu 1230 which shows available in-context editing functions.

While an object is being dragged, in real time, a position validation is performed to verify whether the intended dropping location is valid (e.g., the type of aggregation at the intended location matches that of the object). In this way, objects can only be placed at valid locations. This has a technical effect of preventing data aggregation errors to be inadvertently created by humans.

Palettes section 1203 can provide available data views 1270 and layout containers 1280 that can be dragged over to tree view section 1201 and dropped into the perspective under edit. Availability of data views 1270 and layout containers 1280 can depend on perspective type 1204. New data views can be detected by reading a newly defined perspective view descriptor. As an example, a perspective view descriptor named "views.json" and placed in the root of the solution application can specify item views, action dialog views, node views, and field views.

Data views 1270 and layout containers 1280 can be enriched through in-context menus of functions such as adding module views or custom views to views 1270, adding UI5 control to layout containers 1280, adding API information to a vertical layout container, etc. The enrichment of palettes can be stored on the client side using HTML5 storage.

Properties section 1205 can provide the user with the ability to configure/maintain object-related properties. For layout containers, the properties can be read from the control metadata and rely on the UI5 toolkit version. Field values can be validated and enumerations can be represented through a drop-down menu. For <string> properties, a localization key (e.g., a text key) may be maintained.

CSS section 1207 can provide the user with the ability to enhance a data view with CSS code. For example, custom CSS class 1290 can be assigned to any data view. The CSS data can be stored in a table at the backend. At runtime, the CSS data can be dynamically injected in the browser's document object model (DOM). The DOM is a W3C (World Wide Web Consortium) standard for accessing documents. It is a platform- and language-neutral interface that allows programs and scripts to dynamically access and update the content, structure, and style of a document.

As discussed above, the perspective editor is built on the universal application framework. The perspective editor supports displaying business objects (e.g., processes, documents, etc.) as well as technical objects such as perspectives. However, certain features of the perspective editor are hidden from and not available to administrators and end users. For example, a tree is used only for editing perspectives and not needed for business cases. Also, the layout control is not needed in business solutions. Therefore, certain dedicated data views for maintaining perspectives are only visible when using the perspective editor in the editing mode to create or configure a perspective. Once the UI designer is done editing, the UI designer can save the perspective (e.g., in data store 655), exit the perspective editor, and use the perspective to create a UI app or run the UI app to view the perspective as modified.

To create a UI app, a UI designer can start with a root node for a solution application (see, e.g., root node 1001) which, like the perspective editor, can be created using the customizing tool. The solution application provides the UI designer with perspective-driven parts and non-perspective driven parts of a UI app. The display (layout) for non-perspective driven parts is fixed, although data displayed therein is configurable.

The complexity of the configuration of a UI app can depend on whether a process is involved. For example, it can be straightforward to build a read-only (with navigation) or display-only (without navigation) application. If it is desired for a UI app to write data and/or perform a process, it is not impossible, but it might be more involved. For example, a process would need to be configured in accordance with business rules, a linkage would need to be established between a process engine and the UI app, and everything in between would need to be configured. Finally, the UI app is configured for controlling what a user can view in the UI app, which fields to display, where they are displayed, which pattern to use, and how they are displayed in the UI app. Throughout these configuration steps, the data remains stored and maintained in the backend (e.g., on an ERP system) and nothing is transferred out of the backend. A UI app can be built this way in about an hour or less, which is a significant improvement over traditional application development environments.

The display for any perspective-driven part of the UI app is fully configurable using a perspective or perspectives. As illustrated in FIG. 12, through the perspective editor, a UI designer can easily change layout containers and arrange data views differently completely without touching business logic. This is not possible before because layout was not separated from the data and business logic. Decoupling the layout from the data and business logic provides UI designers with full control of the layout, except the area(s) such as the inbox that is not driven by perspectives and that is directly coupled to fundamental application behaviors.

FIG. 13A depicts a diagrammatic representation of an example of configuring a block which, when activated through an end user's home page, launches a UI app according to some embodiments. Any suitable application or homepage designer tool can be used to configure a home page block. An example of a block creation process is described above with reference to FIG. 3. An example of a homepage designer tool can be the FIORI launchpad designer tool provided by SAP. A UI designer, in this case, can use the FIORI launchpad designer tool to configure block 1300 for launching an UI app called "My Processed Delivery Notes." In this example, the UI design configures block 1300 with general information 1301 such as title, subtitle, keywords, icon, etc. and navigation information such as semantic object 1303, action 1305, parameters 1307, and target URL 1309.

Semantic object 1303 drives the display and dictates the navigation within a UI app. This navigation can be specific to a high-level grouping mechanism such as a solution (e.g., "Business Center"), but generic to individual UI apps in the solution. Without modifying the FIORI launchpad designer tool, the universal application framework has made it possible to build different UI apps that share some of the same navigation information such as semantic object 1303 and action 1305 but that have different, customizable application behaviors for different purposes. This is possible by configuring UI apps in the same solution to the same target mapping. This is illustrated in FIG. 13B.

In the example of FIG. 13B, blocks 1310 representing a plurality of UI apps have been configured (e.g., using the FIORI launchpad designer tool) with the same target mapping 1309 (which references or points to the same semantic object "Z_BC" 1303) and certain specified action (e.g., "display") 1305. However, blocks 1310 have different technical details in application parameters 1307.

Application parameters 1307 essentially instruct, at runtime, how each UI app represented by a block should behave, which object to launch, and so on. The application parameters are what the system (e.g., UI engine 610) parses at runtime.

As an example, suppose a block for launching a UI app "HR Documents" is configured with the following application parameters "nodeID=PS05_HR_INBOX&, wobjType=PS05_PRC_HR&workplaceId=WP_INBOX& system=D9P" (which is a text string). The text string, which can be viewed using a Notepad app or any text editor, describes what object to display when the UI app "HR Documents" is launched from the block. For example, the system can parse a work object type (e.g., "wobjType=PS05_PRC_HR") from the application parameter string, fetch a perspective "PS05_PRC_HR" that is bound to the work object type, and populate a perspective-driven part of the UI app "HR Documents" with the data views and layout information contained in the perspective "PS05_PRC_HR." Before the UI app "HR Documents" can be run, the perspective "PS05_PRC_HR" would have to be created using the perspective editor and stored at the backend (e.g., data store 655).

At runtime, the system may also parse out workplace logical entities. As discussed above, a workplace refers to a collection of nodes. Each node refers to a collection or selection of rows from a database table. Nodes can be grouped or associated by workplace. The system can populate a non-perspective-driven part of the UI app "HR Documents" (e.g., the inbox) with the selection of rows (having the node ID).

As discussed above, a UI app can leverage a technical application component, referred to herein as a "solution application," of the universal application framework to provide non-purpose-specific action and navigation elements. The technical details of this solution application can also be configured using the FIORI launchpad designer tool. FIG. 14 depicts a diagrammatic representation of an example of configuring a target mapping including the referenced technical application component and semantic object with its action.

Although the example described above with reference to FIGS. 13A-14 leverages the SAP FIORI launchpad designer tool and the SAP platform, those skilled in the art appreciate that the example is meant to be non-limiting and that a browser application could utilize the universal application framework by directing a URL that includes application parameters that reference the logical entities defined in the universal application framework. The underlying application framework is a universal infrastructure, so it does not matter whether it is a business object or a technical object, it will display these different objects in the same manner. However, the perspective editor is particularly configured for displaying technical objects such as perspectives. There can be perspectives for solutions and perspectives for the perspective editor itself.

At runtime, application parameters can also specify an application mode. Examples of different application modes can include the following:

FullScreen showing a workplace: "workplaceId=<X>&appMode=FS"

FullScreen showing only one node: "workplaceId=<X>&wobjType=<Y>&nodeId<Z>& appMode=FS"

MasterDetail showing one node: "workplaceId=<X>&wobjType=<Y>&nodeId<Z>& appMode=MD"

MasterDetail with showing one node with SplitAppMode=HideMode:

"workplaceId=<X>&wobjType=<Y>&nodeId<Z>& appMode=MD&splitAppMode=HideMode"

Additionally, a parameter "letterBox=<TRUE|FALSE>" can be used to steer whether the application consumes full space on screen in an end user's home page.

Figure 15:
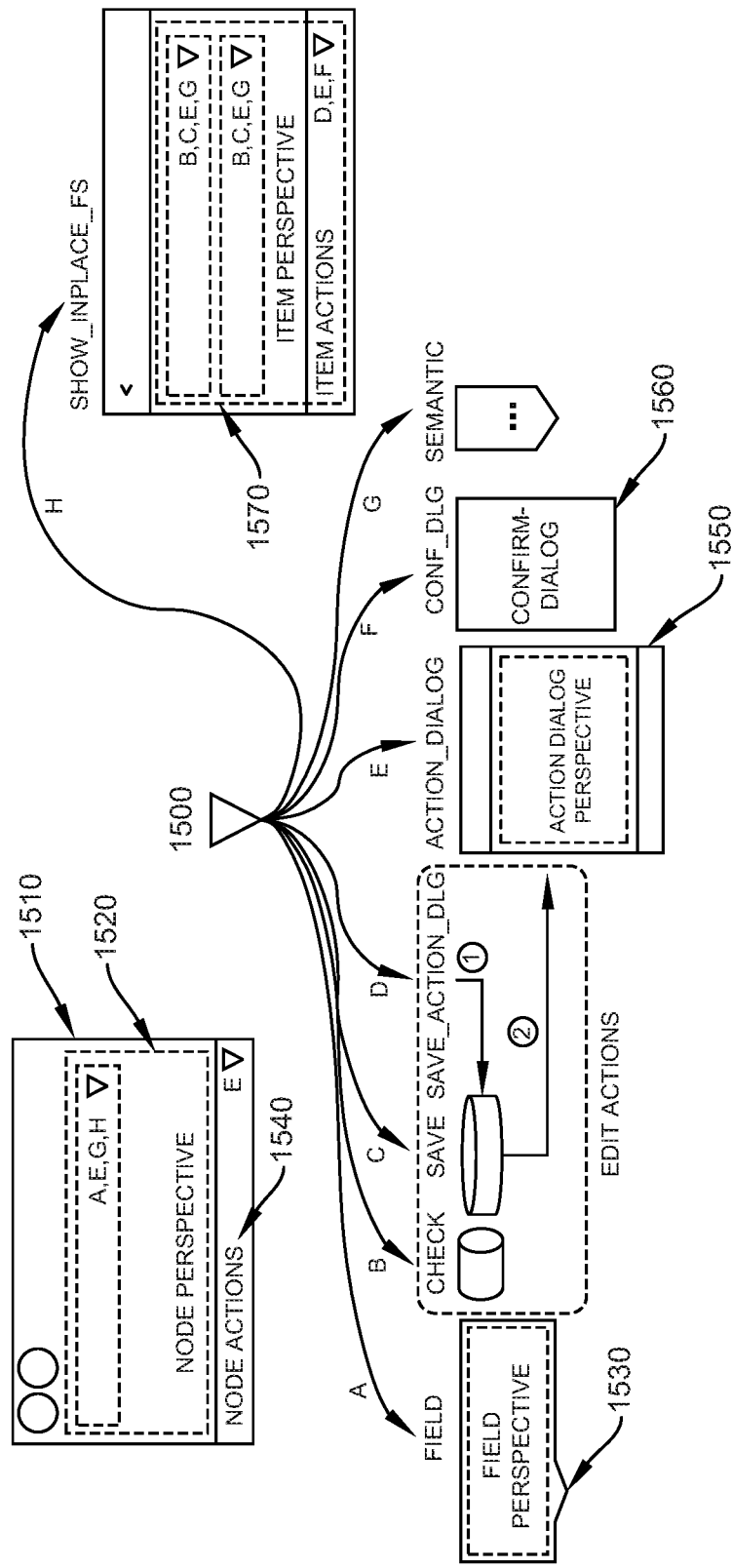
FIG. 15 depicts a diagrammatic representation of an example of navigating a UI app in a full screen application mode according to some embodiments.

FIG. 15 depicts a diagrammatic representation of an example of navigating a UI app in a full screen application mode according to some embodiments. At runtime, process 1500 is operable to launch UI app 1510 on an end user's device by first fetching node perspective 1520 which, in turn, references field perspective 1530 (A). This allows process 1500 to present data bound to field perspective 1530 within node perspective 1520 on the user device. Responsive to the end user interacting with node actions 1540, process 150 may go through a series of steps (B-D) to determine an appropriate action and fetch action dialog perspective 1550 (E). Process 1500 may operate to display confirm dialog 1560 in accordance with action dialog perspective (F). As discussed above, a semantic object drives the display and navigation (G). In this case, semantic navigation drives process 1500 for the UI app to fetch item perspective 1570 (H). As illustrated in FIG. 15, in the full screen application mode, what is displayed on the full screen is driven by a perspective (e.g., node perspective 1520, item perspective 1570).

Figure 16:
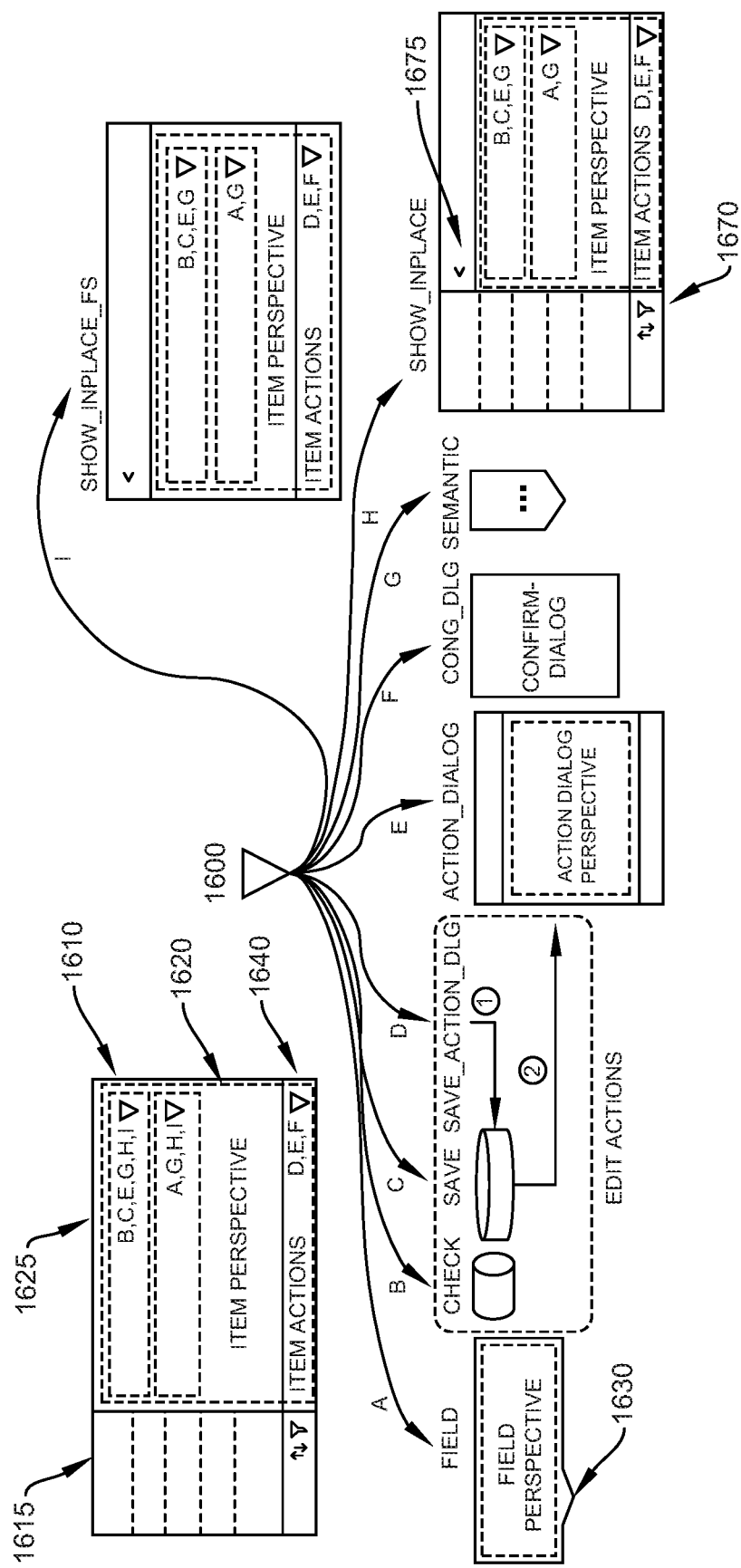
FIG. 16 depicts a diagrammatic representation of an example of navigating a UI app in a master detail application mode according to some embodiments.

FIG. 16 depicts a diagrammatic representation of an example of navigating a UI app in a master detail application mode according to some embodiments. At runtime, process 1600 is operable to launch UI app 1610 on an end user's device by first fetching item perspective 1620 which, in turn, references field perspective 1630 (which can be the same as field perspective 1530) (A). From there, the end user can interact with item actions 1640 and navigate to item perspective 1670. In response, process 160 may perform steps (B-G) that are similar to the steps performed by process 150 describe above and display item perspective 1670 on the end user's device. However, in this case, non-perspective-driven part 1615 is visible in UI app 1610 and the user's interaction with item actions 1640 may affect only perspective-driven part 1625. Responsive to the user selecting minimizing 1675, process 160 may operate to display item perspective 1670 in full screen (H).

Figure 17:
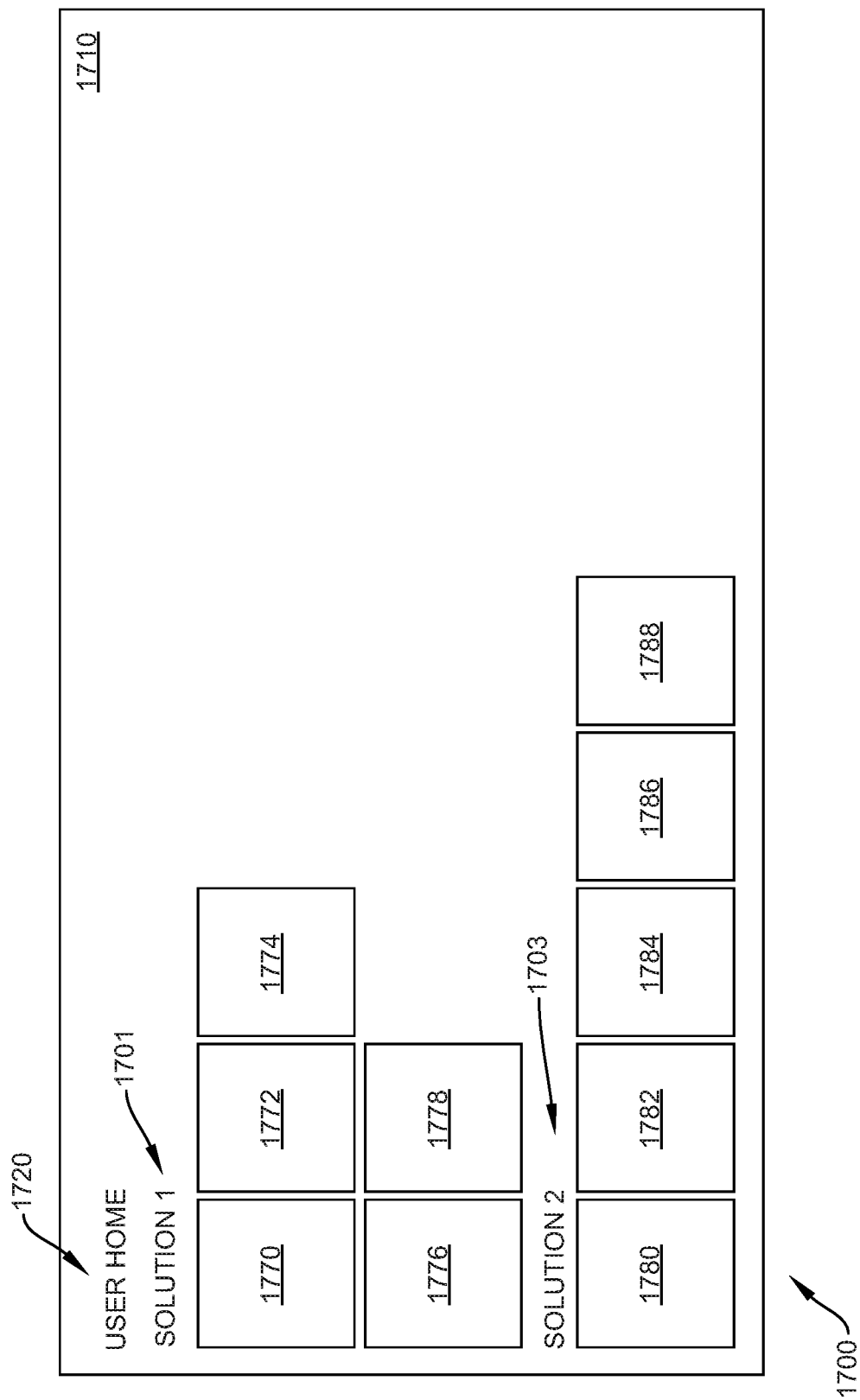
FIG. 17 depicts a diagrammatic representation of an example of a home page showing blocks representing UI apps according to some embodiments.

At the frontend, there are different types of navigation. For example, as discussed above, a UI app (e.g., UI app 1510, UI app 1610) can be launched from an end user's home page. This home page itself can be an application. FIG. 17 depicts a diagrammatic representation of an example of home page application 1700.

In the example of FIG. 17, home page application 1700 shows home page 1710 for user 1720. Home page 1710 can be configured (e.g., using the FIORI launchpad designer tool) with blocks 1770-1788 representing UI apps appropriate for the end user's role in an enterprise computing environment. In some cases, only a single UI app may be shown on a user's home page.

When user 1720 selects a block from home page 1710, a UI app corresponding to the tile opens. This is part of the SAP infrastructure, which maintains the tiles and provides direction. A difference here is that target mapping is used to describe how to launch a UI app and how multiple tiles can point to the same target, as described above. That is, a tile shown in a user's home page is not directly linked to a UI app, but it specifies which action on which semantic object should be executed. As discussed above, this is done through target mapping in which available actions under a semantic object are described (e.g., using a homepage designer tool or the FIORI launchpad designer tool) with the concrete application (target) URLs. Through this indirection (target mapping), it is possible to exchange the application behind an action without touching any block linked to it.

In the example of FIG. 17, blocks 1770-1788 are by category or solution (e.g., solution 1701, solution 1703). When a UI app in a solution launches, certain solution-level action(s) are taken, including executing a particular semantic object. That is, a user clicking or otherwise selecting a block within a solution will open up a UI app that is built on a "generic" application for that solution. The term "generic" in this case does not mean generic software that can run on a variety of machines. Rather, it is used herein to describe a non-purpose-specific application that can run on the ABAP platform and that has a one-application-to-multiple-tasks relationship, in contrast with role-based purpose-specific applications that usually run on the ABAP platform on the basis of one application per role per task. Such a "generic" application can be generic as to the tasks, but specific as to a solution and hence is referred to herein as a "solution" application.

Essentially, what an end user sees, upon logging in to their home page, is a workplace with a node list (e.g., blocks 1770-1788), but with different data displayed from node to node. Suppose the end user selects a "My Processed Remittance Advices" block, which launches a UI app having a full screen pattern similar to perspective editor 1100. In a non-perspective-driven part, the UI app also has a search function that allows the end user to search processed remittance advices, for instance, by account type, company code, or process key. When the end user clicks on a process key to view an associated perspective, the same UI pattern can be used to display different data and provide completely different navigation, for instance, based on a column process key.

The possibility, for instance, to navigate from a workplace to a node list to a node in this manner is a new user experience particularly for business users. In this aspect, the solution application (e.g., "Business Center") can be considered a universal application instrumented to provide better utilization of the underlying data. Again, home page 1710 is a non-limiting example of how a user can launch a UI app that is built on the universal application framework disclosed herein. As described above, in some embodiments, a UI app can be launched from a URL that contains application parameters referencing logical entities configured for the UI app in the universal application framework.

Figure 18B:
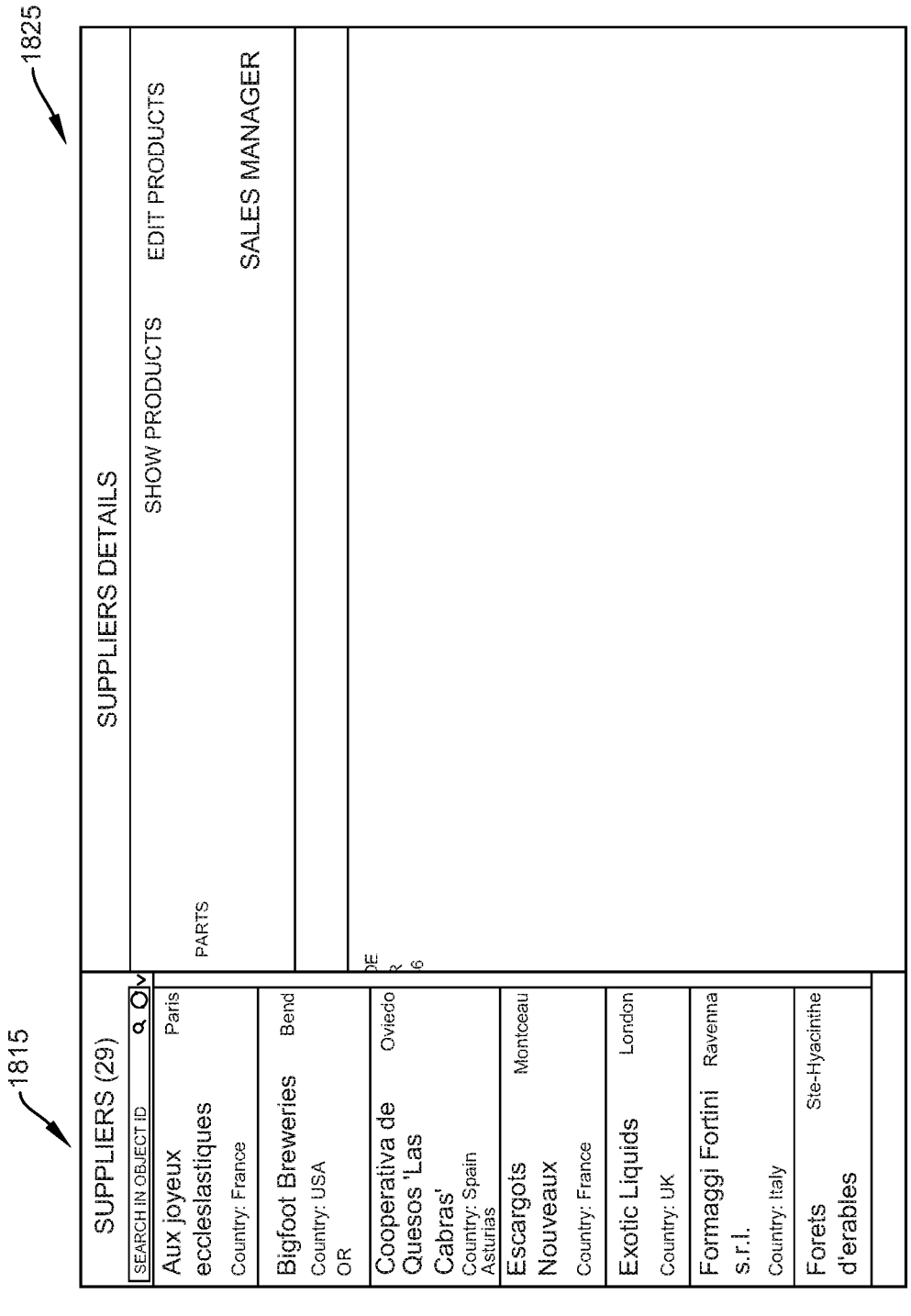

FIGS. 18A-B depict a diagrammatic representation of an example of a UI app according to some embodiments. In the example of FIG. 18A, UI app "Supplier Details" 1800 is built on the universal application framework with perspective-driven application part 1825 in the full screen application mode (UI pattern). As described above, application parameters can be used to dictate empty spaces on the left and right sides of the screen. In this example, only perspective-driven application part 1825 is initially shown and non-perspective-driven application part 1815 hidden from view. In some embodiments, responsive to a user clicking or otherwise selecting user interface element 1801, non-perspective-driven application part 1815 is dynamically displayed on demand, as shown in FIG. 18B.

In the example of FIG. 18B, non-perspective-driven application part 1815 shows a list of 29 suppliers for a particular solution (e.g., solution 1703). As described above, actual data for the 29 suppliers shown in FIG. 12B can be stored in a database datable and fetched at runtime to display in the inbox. That is, at startup of UI app "Supplier Details" 1800, the application parameters parsed from the string stored with the "Suppliers (Master Detail)" block provide the information as to what table to access and what data to retrieve from the table. The information is then provided to the inbox function of UI app "Supplier Details" 1800 and displayed according to the predetermined (non-customizable) layout of the inbox. Although the layout of non-perspective-driven application part 1815 is fixed, the data displayed therein can be customized. The customization of data to be shown in non-perspective-driven application part 1815 can be done by using the customizing tool.

In this way, the same data can be displayed in different UI apps in different layouts. FIG. 19 depicts a diagrammatic representation of an example of UI app 1900. As illustrated in FIG. 19, UI app 1900 is configured for displaying the same 29 suppliers with data from the same database table but in a layout (showing four nodes: "Suppliers," "Inactive Products," "Products w Suppliers," and "Active Products") that is completely different from the layout of UI app 1800 shown in FIG. 18B. As described above, to change a layout, a UI designer can easily move an aggregation in the perspective editor by dragging and dropping. The UI design can save the changes, exit the perspective editor and run the UI app again to see the changed layout.

With the perspective tool, it is rather easy and efficient to take a layout container out and/or arrange data views differently completely without touching business logic. This is not possible before because layout was not separated from the data and business logic. Decoupling the layout from the data and business logic provides UI designers with full control of the layout, except the area(s) such as the inbox that is directly coupled to fundamental application behaviors.

Not every area in a UI app can be controlled through perspectives because there are static parts that do not need to be changed. For example, non-perspective-driven application part 1815 can be driven by fundamental application behavior/logic.

UI designers can control what data to be displayed in the inbox (using the customizing tool), but they cannot move the inbox. This is because displaying the inbox at the predetermined position is part of the application's fundamental behavior directly coupled to the underlying infrastructure. The infrastructure is directly connected to any item on the list in the inbox. This specific combination of customizable and not-customizable areas or sections balances two different needs—the need to control layout and the need for consistent and reliable application behaviors. For example, when a user clicks on something on a list, the infrastructure directly coupled to the behavior of the list instructs what perspective must be loaded, what actions must be combined with the perspective, what, if any, applicable filters are to be applied, what search, if any, is to be performed, etc. All these functions are provided as part of the application, so they cannot be modified. This is also different from the freestyle UI5 or SAP application. That is, UI designers may have full control in configuring an UI app, but only to a certain extent—they cannot modify essential services. Otherwise, if they want the inbox to be populated, they have to write an inbox data service for pulling data into the inbox when the UI application is invoked, they have to bind data and instantiate data models, etc. There are many calls that must be made to realize the inbox function. Accordingly, as exemplified below, a UI app generally would have a perspective-drive application part and a non-perspective-drive application part.

Figure 20:
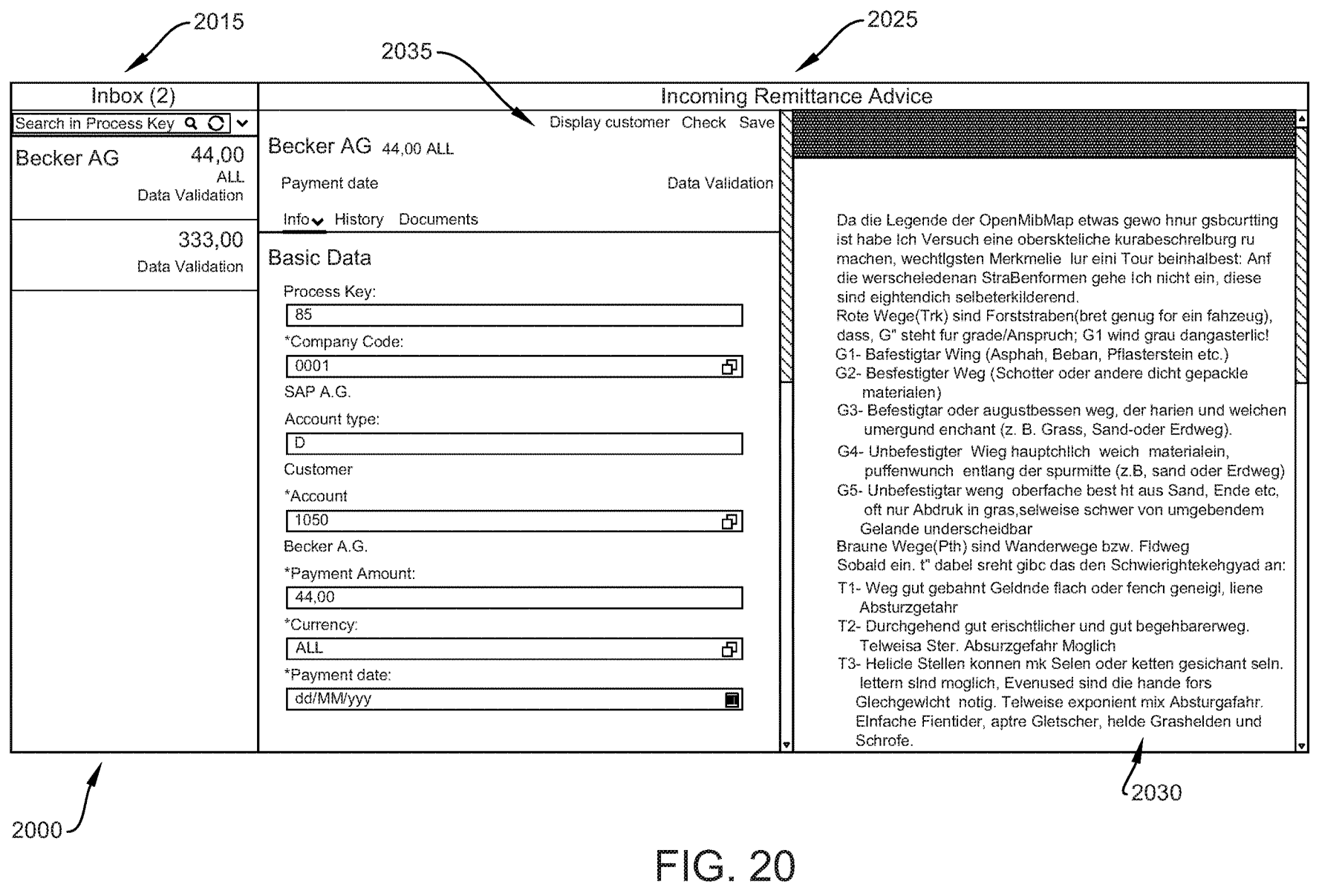

FIG. 20 depicts a diagrammatic representation of an example of a UI app having a non-perspective-driven part and a perspective-driven part according to some embodiments. In the example of FIG. 20, the screen real estate for UI app 2000 is roughly divided into two main sections: non-perspective-driven part 2015 and perspective-driven part 2025.

The left, smaller section is designated for an inbox ("the inbox"). This part of the UI application is not customizable by UI designers as it is not driven by perspectives. The right, larger section, is driven by perspectives and is fully configurable using the perspective editor as described above. The layout on the right, which includes document image, 2030 is described by the corresponding item perspective. Toward the top of this section, there can be action buttons 2035 for various solution-specific functions (e.g., in this example, "Display Customer, "Check," etc.). For instance, when "Display Customer" is selected or clicked by an end user, the "Display Customer" function operates to display the customer fact sheet associated therewith. Other actions may also be possible, for example, actions for submitting the item, creating a remittance advice, making a referral, generating an inquiry, etc. All these actions are specific to that solution. UI designers can use the perspective editor described above to specify actions for the solution—where does an action take place, etc. (top or bottom), what happens dynamically and programmatically when an action is selected at runtime. Again, a perspective can be changed at any time using the perspective editor.

In the example of FIG. 20, UI app 2000 is built using the full screen pattern. There's no need for a UI designer to implement additional client side logic because the universal application framework provides an abstraction of the data, the client-side logic, and a solution application (e.g., a Business Center tool kit) for a UI designer to specify data, data fields (e.g., search field), actions (e.g., how data views should be populated), any action navigation, etc., to build a UI app. For example, if a UI designer wants to build a read-only UI application (for displaying data only), they can quickly build one that enables an end user to navigate through clicking only. An "application node object" is a special UI application which displays the details of an object as an application. No navigation is allowed.

Figure 21:
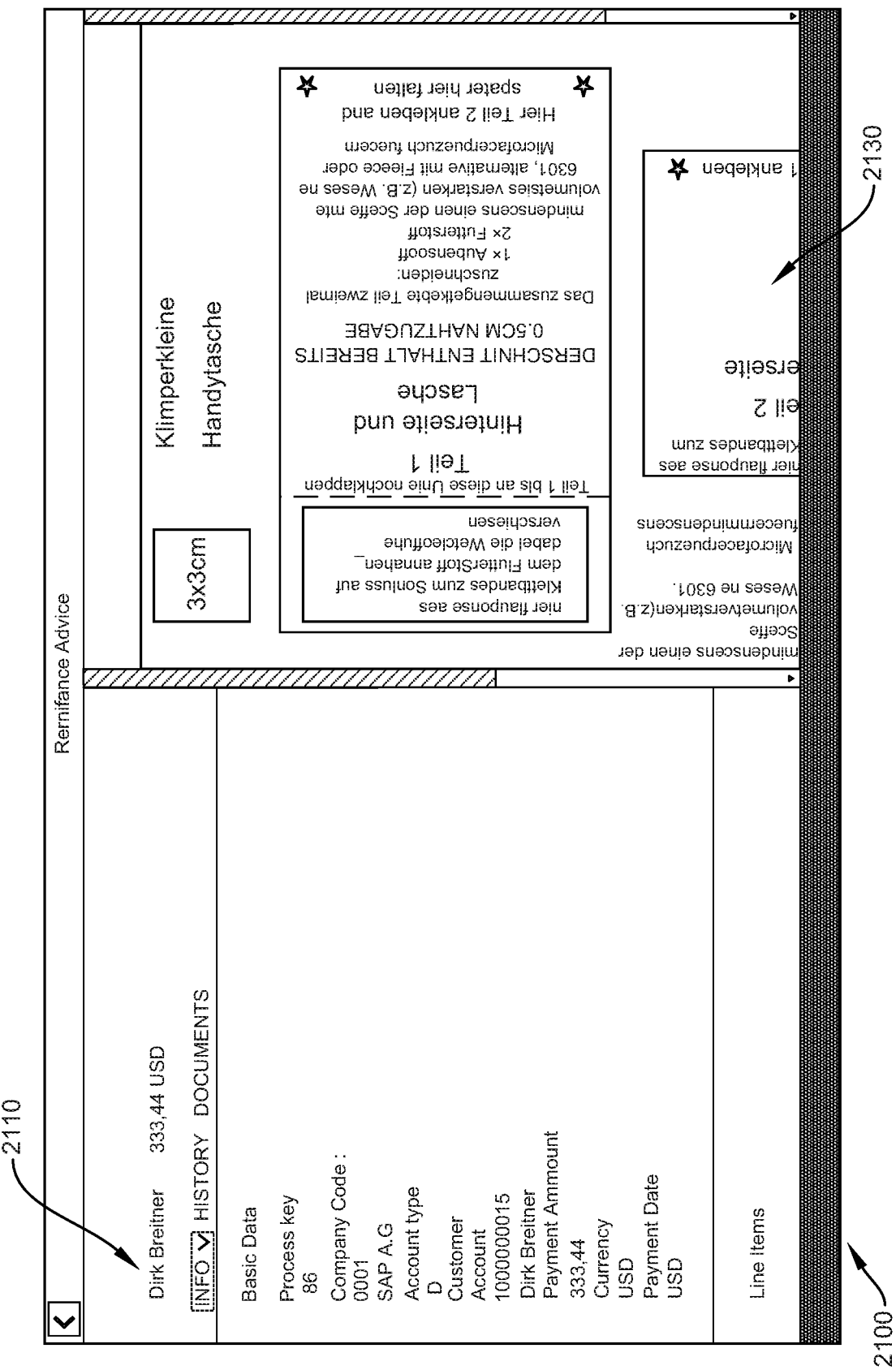
FIG. 21 depicts a diagrammatic representation of an example of a read-only UI app which displays details of an object according to some embodiments.

FIG. 21 depicts a diagrammatic representation of an example of read-only UI app 2100 which displays details of object 2110, including document image 2130, according to some embodiments. Since no input fields are needed, no additional client-side logic is needed. UI app 2100 can be completely framework-driven.

If the UI designer wants to build a UI application that also writes, they can edit master detail and specify where data is to be stored (e.g., a table). Storing data in a table (which is maintained at the backend) is something that the application framework cannot know and cannot directly customize, so some technical implementation using the customizing tool may be needed.

Note that even for non-perspective driven application parts, it is only the display (layout) is fixed. The data displayed in non-perspective driven application parts is customizable. For example, each row in a table can be modeled in the perspective editor as a type. The perspective editor itself cannot be modified.

In the read-only UI app exemplified in FIG. 21, no empty space is shown on the screen.

That need not be always the case. FIG. 22 depicts a diagrammatic representation of an example of a UI app with customizable screen appearance according to some embodiments. In the example of FIG. 22, UI app 2200 is configured with empty spaces on the left and right sides of the screen. This initial appearance can be set by an application parameter. Other customizations are also possible. For example, the inbox can be configured to be hidden initially and display on demand dynamically. Further, a portion of the perspective-driven part can be configured to show the content of a file (e.g., an image of a document). In-place navigation is also possible.

Because layout is completely decoupled from business logic and/or data views, it is easy and efficient to change layout completely. As discussed above, what layout is available for a perspective depends on the type of the perspective (e.g., an item perspective, an action dialog perspective, or a field perspective). A difference between the full screen pattern for an item perspective and the dialog pattern for an action dialog perspective is in how many available fields that can be placed.

FIG. 23 depicts a diagrammatic representation of an example of a dialog pattern for dialog 2300 according to some embodiments. In an action dialog perspective, only a subset of fields is available for use because, by nature, an action dialog perspective is different from a full screen perspective. This logic to the perspective concept is also new. Typically, to build a dialog box or window, a programmer would need to know which views and what fields can be used in a dialog and would also need to know the techniques and technical details. Here, dialogs can be built using the dialog pattern without requiring complex coding and in-depth knowledge of the underlying system.

Figure 24A:
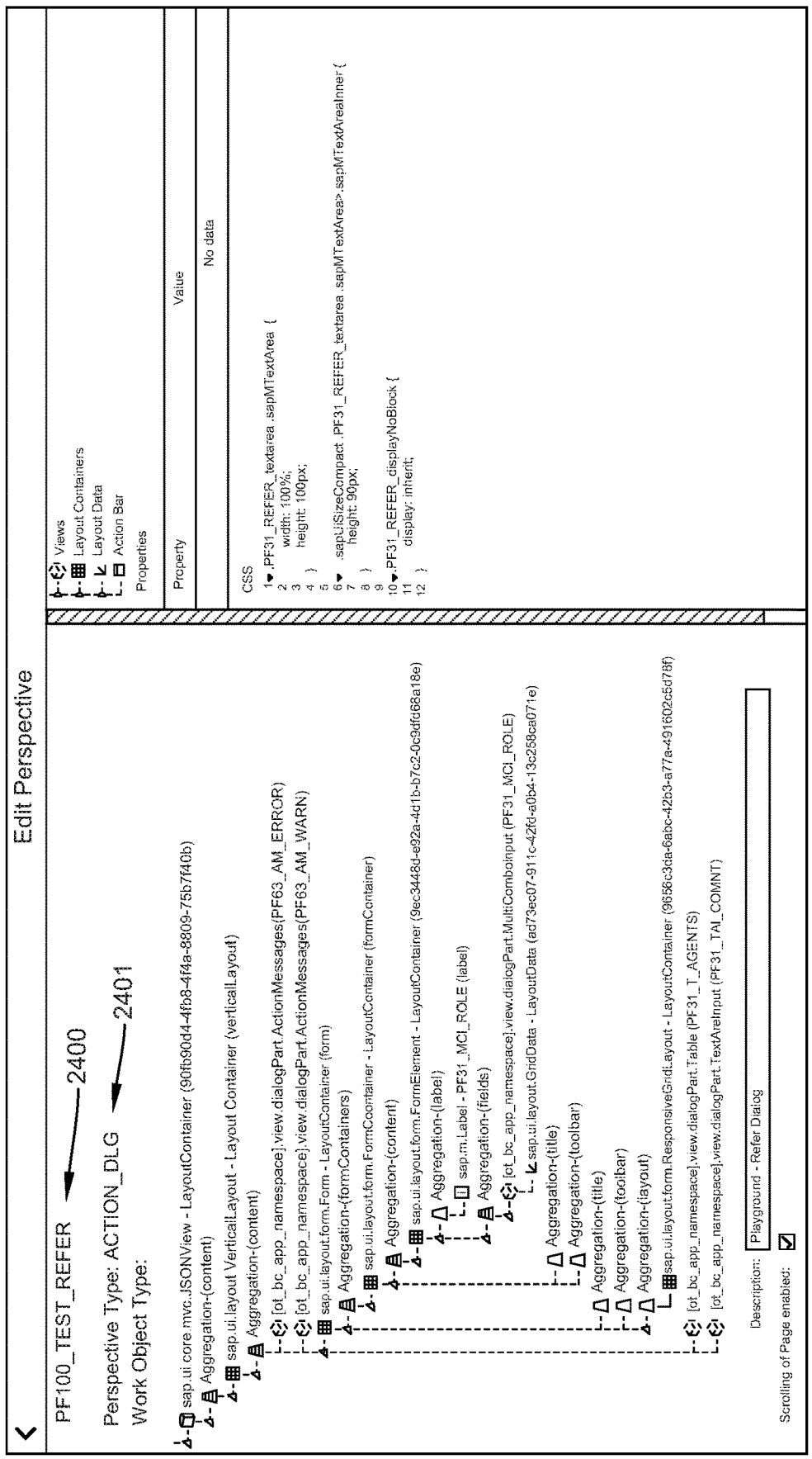
FIG. 24A depicts a diagrammatic representation of an example of a perspective editor showing a perspective having an action dialog perspective type that controls the layout arrangement of FIG. 23 according to some embodiments.
Figure 24B:
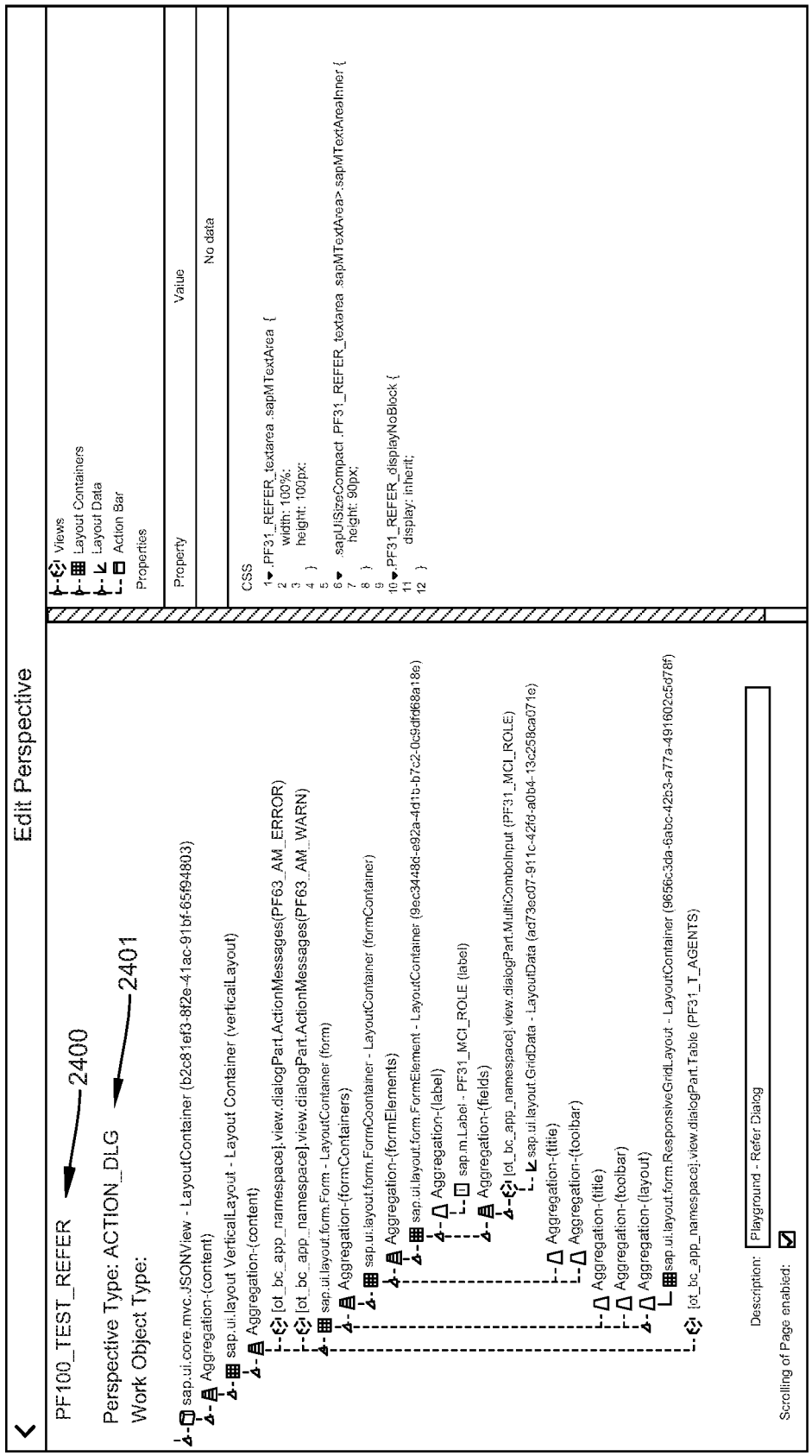
FIG. 24B depicts a diagrammatic representation of the perspective of FIG. 24A modified using the perspective editor according to some embodiments.
Figure 25:
FIG. 25 depicts a diagrammatic representation of an example of a layout arrangement corresponding to the perspective of FIG. 24B according to some embodiments.

FIG. 24A depicts a diagrammatic representation of an example of a perspective editor showing perspective 2400 "PF100_TEST_REFER" having an action dialog perspective type 2401 "ACTION_DLG" that controls the layout arrangement of FIG. 23 according to some embodiments. FIG. 24B depicts a diagrammatic representation of perspective 2400 modified with the removal of element PF31_TAI_COMNT. FIG. 25 depicts a diagrammatic representation of an example of a different dialog pattern for dialog 2500 corresponding to the perspective of FIG. 24B.

Before the perspective editor, rigid, error prone, different complex coding processes are required to create UI templates. UI developers did not have a way to create data views as they are too complicated to realize different UIs. Further, UI developers did not have control of layout. For example, to display data from a database table, conventionally, a UI builder has to specify a hard-coded template using a web application builder which shows layout data in XML. This hard-coded template is not visualized to the UI builder. While the UI builder can specify position and maintain values, the UI builder has no immediate feedback on how the data would be displayed on an end user's screen.

The new perspective editor allows data binding between data views and the underlying data tables in a seamless manner. This tool can be useful to various types of users, including, for example, process builders, implementers, business center application developers, service providers, customers, etc. Initially, the UIs can all look the same. UI designers can use a "base" UI application out of box to get a jump start in creating their custom UI apps. The perspective editor comes out of box with a set of data views ready for customization. If a customer finds these data views not enough, they can implement their custom (module) data views and imported into the BC (solution) application. Using the perspective editor, UI designers can quickly and efficiently create UI apps using UI patterns with perspectives.

Through novel features like the perspectives, the universal application framework disclosed herein can provide an abstraction layer above the data layer. This means that configuration and manipulation of layouts and displays can be completely decoupled from tables and data structures where data is actually stored (e.g., on an ABAP system at the backend). This provides UI designers with unparalleled flexibility in creating and configuring UI applications without having to have complex coding and database integration programming knowledge.

FIG. 26 depicts a diagrammatic representation of a distributed network computing environment where embodiments disclosed can be implemented. In the example illustrated, network computing environment 2600 includes network 2614 that can be bi-directionally coupled to frontend server 2612, user computer 2615, and backend server 2616. Backend server 2616 can be bi-directionally coupled to database 2618. Network 2614 may represent a combination of wired and wireless networks that network computing environment 2600 may utilize for various types of network communications known to those skilled in the art.

For the purpose of illustration, a single system is shown for each of frontend server 2612, user computer 2615, and backend server 2616. However, with each of frontend server 2612, user computer 2615, and backend server 2616, a plurality of computers (not shown) may be interconnected to each other over network 2614. For example, a plurality of frontend servers 2612 and a plurality of user computers 2615 may be coupled to network 2614. Frontend server 2612 may include data processing systems for communicating with backend server 2616.

Frontend server 2612 can include central processing unit ("CPU") 2620, read-only memory ("ROM") 2622, random access memory ("RAM") 2624, hard drive ("HD") or storage memory 2626, and input/output device(s) ("I/O") 2628. I/O 2629 can include a keyboard, monitor, printer, electronic pointing device (e.g., mouse, trackball, stylus, etc.), or the like. Backend server 2616 may be similar to frontend server 2612 and can comprise CPU 2660, ROM 2662, RAM 2664, HD 2666, and I/O 2668. Backend server 2616 may embody one or more backend systems configured for providing a variety of services to frontend server 2612 over network 2614. These services may utilize data stored in database 2618.

Likewise, use computer 2615 may include CPU 2650, ROM 2652, RAM 2654, HD 2656, and I/O 2658. User computer 2615 can include a desktop computer, a laptop computer, a personal digital assistant, a cellular phone, or nearly any device capable of communicating over a network. Many other alternative configurations are possible and known to skilled artisans.

Each of the computers in FIG. 26 may have more than one CPU, ROM, RAM, HD, I/O, or other hardware components. For the sake of brevity, each computer is illustrated as having one of each of the hardware components, even if more than one is used. Each of computers 2612, 2615, and 2616 is an example of a data processing system. ROM 2622, 2652, and 2662; RAM 2624, 2654, and 2664; HD 2626, 2656, and 2666; and database 2618 can include media that can be read by CPU 2620, 2650, or 2660. Therefore, these types of memories include non-transitory computer-readable storage media. These memories may be internal or external to computers 2612, 2615, or 2616.

Portions of the methods described herein may be implemented in suitable software code that may reside within ROM 2622, 2652, or 2662; RAM 2624, 2654, or 2664; or HD 2626, 2656, or 2666. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A method, comprising:
  receiving, by a universal frontend interface application of a universal application framework on a server machine operating in an enterprise computing network, an indication from a user device to start a user interface (UI) application on the user device, the indication including application parameters associated with the UI application;
  determining, by the universal frontend interface application from the application parameters, an application mode and logical entities for the UI application, wherein the application mode is based on a hierarchical entry point to a data source of the UI application, wherein the logical entities are defined in the universal application framework in the enterprise computing network, wherein the data source resides in a storage in the enterprise computing network, wherein the logical entities determine at least a perspective for a perspective-driven part of the UI application, wherein the perspective is bound to an instance of the logical entities, and wherein the perspective comprises a perspective-driven layout and data views bound to the data source; and
  communicating, by the universal frontend interface application, the application mode and the logical entities for the UI application to a technical application component of the universal application framework, the universal application framework comprising a code structure for creating the UI application at runtime as the UI application is started on the user device, wherein the creating the UI application comprises:
    fetching application configuration for the UI application from the universal application framework;
    fetching data for the UI application from the data source; and
    deriving and loading the perspective in the perspective-driven part of the UI application on the user device, the deriving and loading utilizing the hierarchical entry point of the data source to display the data from the data source according to the perspective-driven layout and the data views described in the perspective.

2. The method according to claim 1, wherein the creating the UI application further comprises:
  initializing a non-perspective-driven part of the UI application, wherein the initializing the non-perspective-driven part of the UI application comprises fetching action and navigation information from the technical application component of the universal application framework, wherein the non-perspective-driven part of the UI application has a fixed layout.

3. The method according to claim 1, wherein the UI application is specific to a role of a user associated with the user device.

4. The method according to claim 1, further comprising:
  creating or configuring the logical entities, wherein each logical entity comprises a work object type, a node, a workspace, or an item.

5. The method according to claim 1, further comprising:
  creating or modeling the perspective using a perspective editing tool, the perspective editing tool comprising a tree view section, a views section, a layout containers section, and a properties section.

6. The method according to claim 1, further comprising:
  creating a data binding that binds the perspective to the instance of the logical entities.

7. The method according to claim 1, wherein the perspective has a perspective type and wherein the perspective type controls which data view is usable in the perspective.

8. A system, comprising:
a processor;
a non-transitory computer-readable medium; and
stored instructions translatable by the processor for implementing a universal frontend interface application of a universal application framework on a server machine operating in an enterprise computing network for:
receiving an indication from a user device to start a user interface (UI) application on the user device, the indication including application parameters associated with the UI application;
determining, from the application parameters, an application mode and logical entities for the UI application, wherein the application mode is based on a hierarchical entry point to a data source of the UI application, wherein the logical entities are defined in the universal application framework in the enterprise computing network, wherein the data source resides in a storage in the enterprise computing network, wherein the logical entities determine at least a perspective for a perspective-driven part of the UI application, wherein the perspective is bound to an instance of the logical entities, and wherein the perspective comprises a perspective-driven layout and data views bound to the data source; and
communicating the application mode and the logical entities for the UI application to a technical application component of the universal application framework, the universal application framework comprising a code structure for creating the UI application at runtime as the UI application is started on the user device, wherein the creating the UI application comprises:
fetching application configuration for the UI application from the universal application framework;
fetching data for the UI application from the data source; and
deriving and loading the perspective in the perspective-driven part of the UI application on the user device, the deriving and loading utilizing the hierarchical entry point of the data source to display the data from the data source according to the perspective-driven layout and the data views described in the perspective.

9. The system of claim 8, wherein the creating the UI application further comprises:
initializing a non-perspective-driven part of the UI application, wherein the initializing the non-perspective-driven part of the UI application comprises fetching action and navigation information from the technical application component of the universal application framework, wherein the non-perspective-driven part of the UI application has a fixed layout.

10. The system of claim 8, wherein the UI application is specific to a role of a user associated with the user device.

11. The system of claim 8, wherein the stored instructions are further translatable by the processor for:
creating or configuring the logical entities, wherein each logical entity comprises a work object type, a node, a workspace, or an item.

12. The system of claim 8, wherein the stored instructions are further translatable by the processor for:
creating or modeling the perspective using a perspective editing tool, the perspective editing tool comprising a tree view section, a views section, a layout containers section, and a properties section.

13. The system of claim 8, wherein the stored instructions are further translatable by the processor for:
creating a data binding that binds the perspective to the instance of the logical entities.

14. The system of claim 8, wherein the perspective has a perspective type and wherein the perspective type controls which data view is usable in the perspective.

15. A computer program product comprising a non-transitory computer-readable medium storing instructions translatable by a processor for implementing a universal frontend interface application of a universal application framework on a server machine operating in an enterprise computing network for:
receiving an indication from a user device to start a user interface (UI) application on the user device, the indication including application parameters associated with the UI application;
determining, from the application parameters, an application mode and logical entities for the UI application, wherein the application mode is based on a hierarchical entry point to a data source of the UI application, wherein the logical entities are defined in the universal application framework in the enterprise computing network, wherein the data source resides in a storage in the enterprise computing network, wherein the logical entities determine at least a perspective for a perspective-driven part of the UI application, wherein the perspective is bound to an instance of the logical entities, and wherein the perspective comprises a perspective-driven layout and data views bound to the data source; and
communicating the application mode and the logical entities for the UI application to a technical application component of the universal application framework, the universal application framework comprising a code structure for creating the UI application at runtime as the UI application is started on the user device, wherein the creating the UI application comprises:
fetching application configuration for the UI application from the universal application framework;
fetching data for the UI application from the data source; and
deriving and loading the perspective in the perspective-driven part of the UI application on the user device, the deriving and loading utilizing the hierarchical entry point of the data source to display the data from the data source according to the perspective-driven layout and the data views described in the perspective.

16. The computer program product of claim 15, wherein the creating the UI application further comprises:
initializing a non-perspective-driven part of the UI application, wherein the initializing the non-perspective-driven part of the UI application comprises fetching action and navigation information from the technical application component of the universal application framework, wherein the non-perspective-driven part of the UI application has a fixed layout.

17. The computer program product of claim 15, wherein the instructions are further translatable by the processor for:
creating or configuring the logical entities, wherein each logical entity comprises a work object type, a node, a workspace, or an item.

18. The computer program product of claim 15, wherein the instructions are further translatable by the processor for:
creating or modeling the perspective using a perspective editing tool, the perspective editing tool comprising a tree view section, a views section, a layout containers section, and a properties section.

19. The computer program product of claim 15, wherein the instructions are further translatable by the processor for:
creating a data binding that binds the perspective to the instance of the logical entities.

20. The computer program product of claim 15, wherein the perspective has a perspective type and wherein the perspective type controls which data view is usable in the perspective.

* * * * *

UNITED STATES PATENT AND TRADEMARK OFFICE
CERTIFICATE OF CORRECTION

| | | |
|---|---|---|
| PATENT NO. | : 12,079,603 B2 | Page 1 of 1 |
| APPLICATION NO. | : 17/549610 | |
| DATED | : September 3, 2024 | |
| INVENTOR(S) | : Florian Stephan | |

It is certified that error appears in the above-identified patent and that said Letters Patent is hereby corrected as shown below:

On the Title Page

Item (54) and in the Specification Column 1 Lines 1-3, please cancel the title:
-UNIVERSAL APPLICATION FRAMEWORK FOR STREAMLINED FRONTEND DEVELOPMENT OF USER INTERFACE- And insert:
--UNIVERSAL APPLICATION FRAMEWORK FOR STREAMLINED FRONTEND DEVELOPMENT OF USER INTERFACE APPLICATIONS--

Signed and Sealed this
Thirty-first Day of December, 2024

Derrick Brent
*Acting Director of the United States Patent and Trademark Office*